US009488287B2

United States Patent
Spryshak

(10) Patent No.: US 9,488,287 B2
(45) Date of Patent: Nov. 8, 2016

(54) VALVE

(71) Applicant: Valeo Climate Control Corp., Auburn Hills, MI (US)

(72) Inventor: Joseph Spryshak, Hartland, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 97 days.

(21) Appl. No.: 14/491,575

(22) Filed: Sep. 19, 2014

(65) Prior Publication Data

US 2016/0084388 A1    Mar. 24, 2016

(51) Int. Cl.
*F16K 11/052* (2006.01)
*F16K 31/52* (2006.01)
*F16K 31/524* (2006.01)

(52) U.S. Cl.
CPC ........... *F16K 11/052* (2013.01); *F16K 31/521* (2013.01); *F16K 31/524* (2013.01)

(58) Field of Classification Search
USPC .................................................... 137/625.44
See application file for complete search history.

(56) References Cited

U.S. PATENT DOCUMENTS

| 3,545,470 | A | * | 12/1970 | Paton ..................... | B65G 53/56 137/101 |
| 3,613,548 | A | * | 10/1971 | Motts ..................... | F24F 13/04 137/625.44 |
| 3,895,650 | A | * | 7/1975 | Cadiou .............. | B60H 1/00678 137/625.44 |
| 4,267,880 | A | * | 5/1981 | Jacquet .............. | B60H 1/00678 137/862 |
| 4,498,528 | A | * | 2/1985 | Jacquet .............. | B60H 1/00678 137/625.44 |
| 4,807,665 | A | * | 2/1989 | Schiel ................. | F16K 11/0525 137/625.4 |
| 5,067,506 | A |   | 11/1991 | Ball et al. |  |
| 5,199,461 | A | * | 4/1993 | Carr ................... | B60H 1/00678 137/625.44 |
| 6,595,276 | B2 |   | 7/2003 | Bendell et al. |  |

* cited by examiner

*Primary Examiner* — John Fox
(74) *Attorney, Agent, or Firm* — Dierker & Kavanaugh, P.C.

(57) ABSTRACT

A valve includes a housing defining a flow path having three ports. A door in the flow path selectably controls a flow through the flow path in response to a rotation of a lever. Three seal flanges, each define one of the three ports. The door has three selectable closed positions including a first port closed position, a second port closed position, and a third port closed position. A resilient seal is compressed between a sealing face of the door and each of the three seal flanges respectively in turn when the door is in each of the closed positions. The door has a first pivot axis and a second pivot axis parallel to and spaced from the first pivot axis. The door is alternatively rotatable about the first pivot axis and the second pivot axis to selectably close, each individually and separately in turn, the three ports.

16 Claims, 21 Drawing Sheets

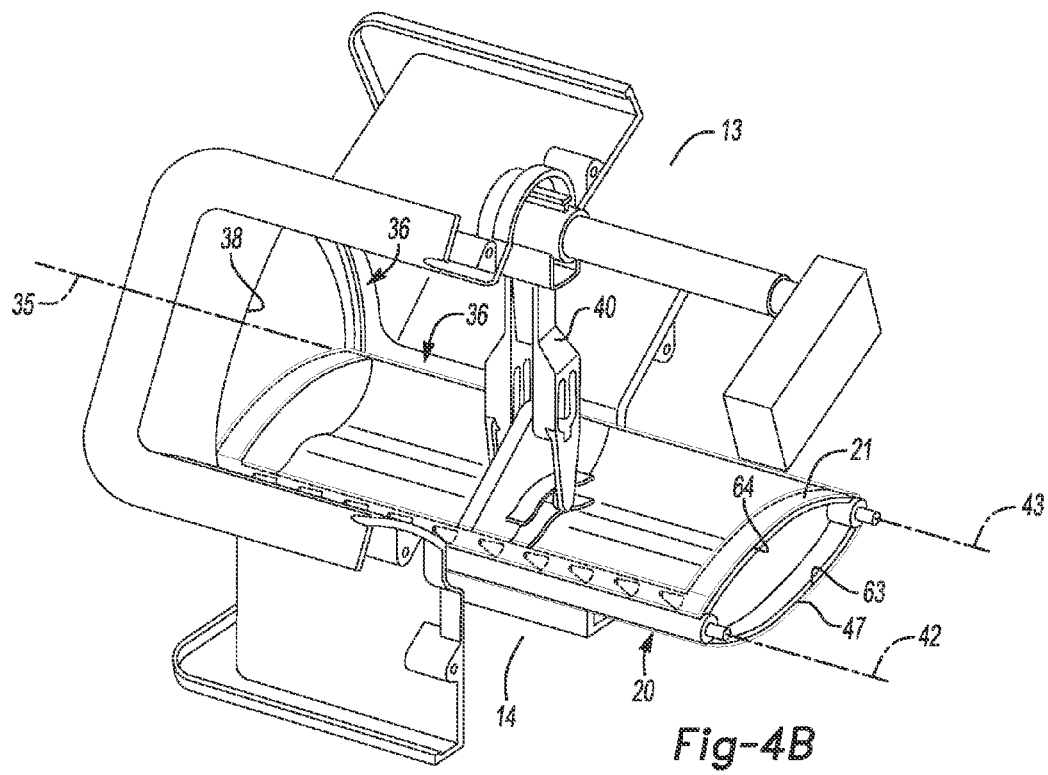
Fig-4B
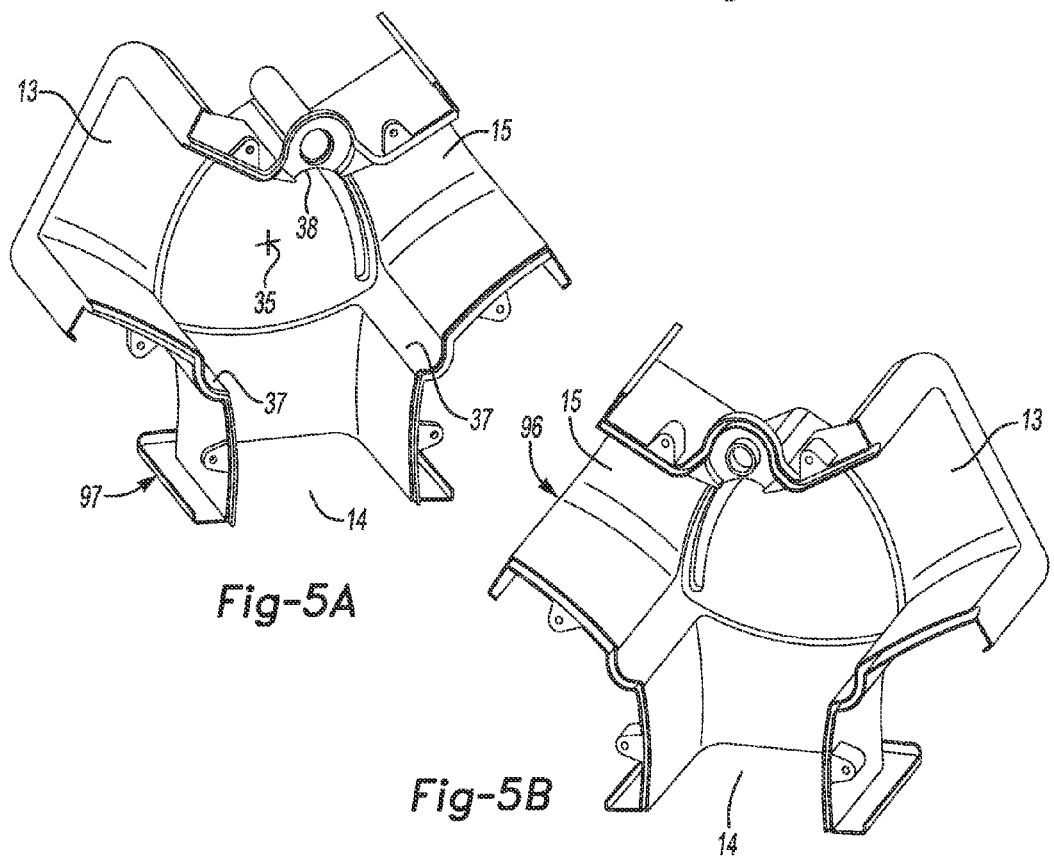
Fig-5A
Fig-5B

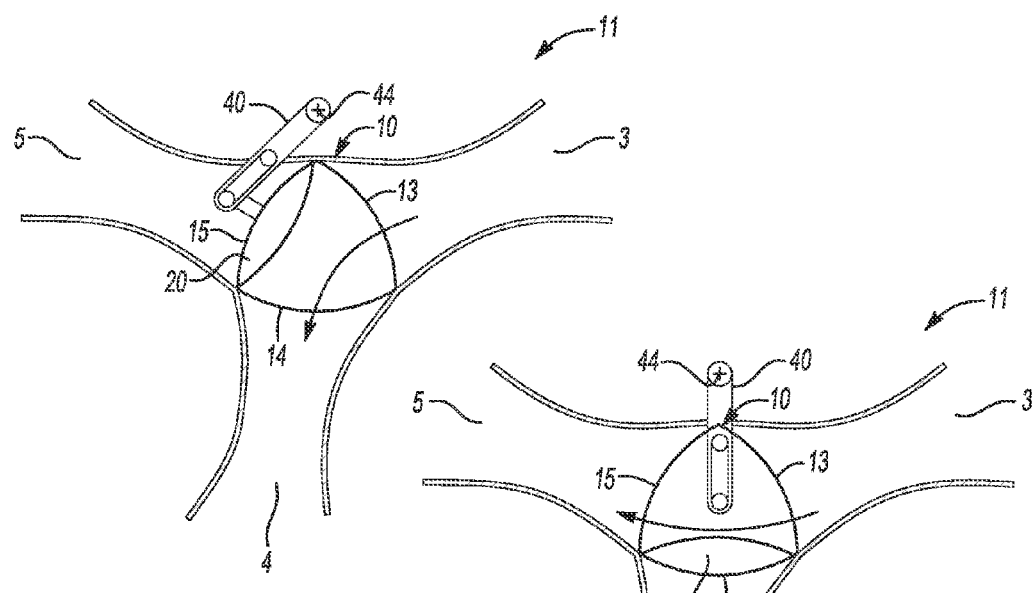
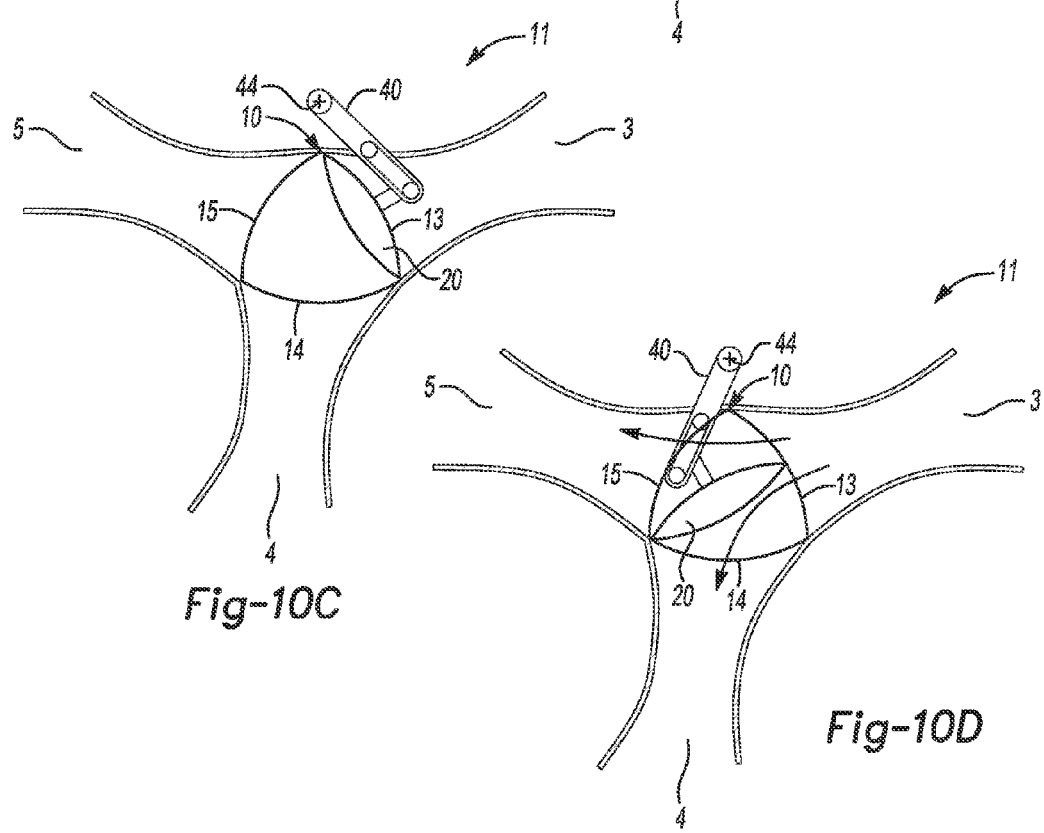
Fig-10A  Fig-10B  Fig-10C  Fig-10D

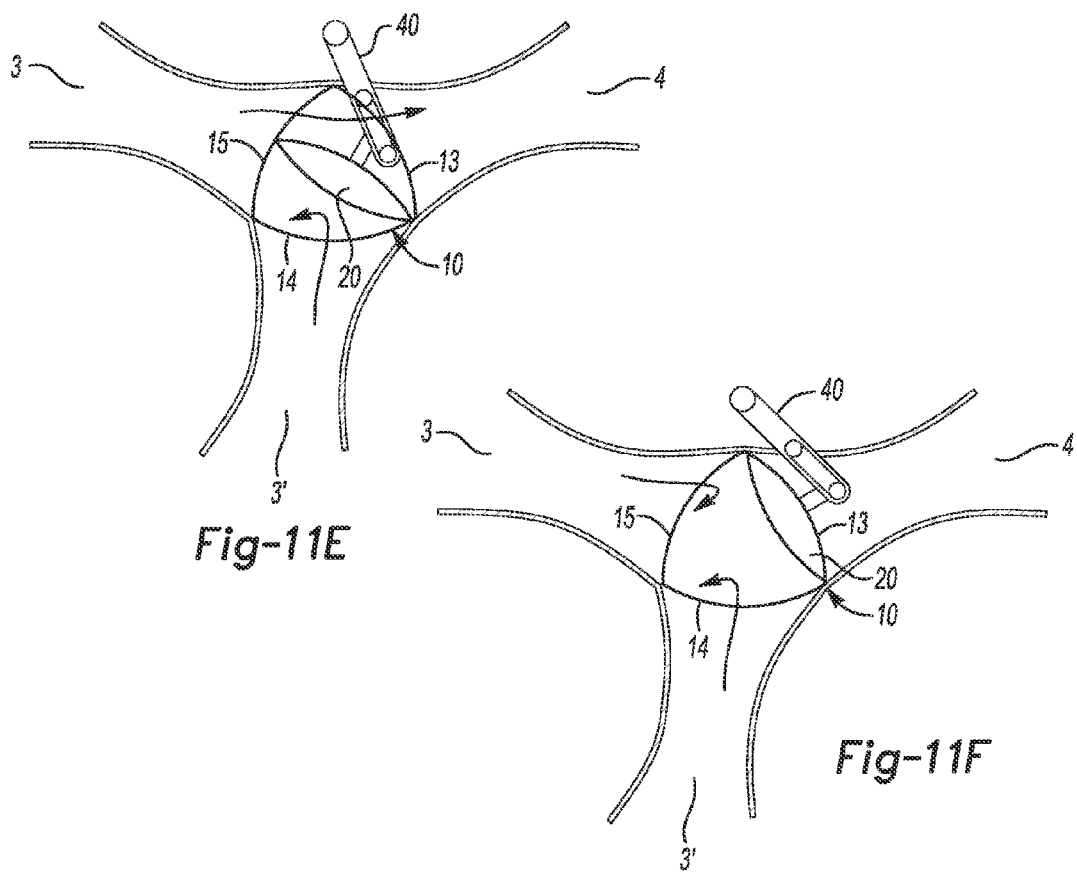
Fig-11E
Fig-11F
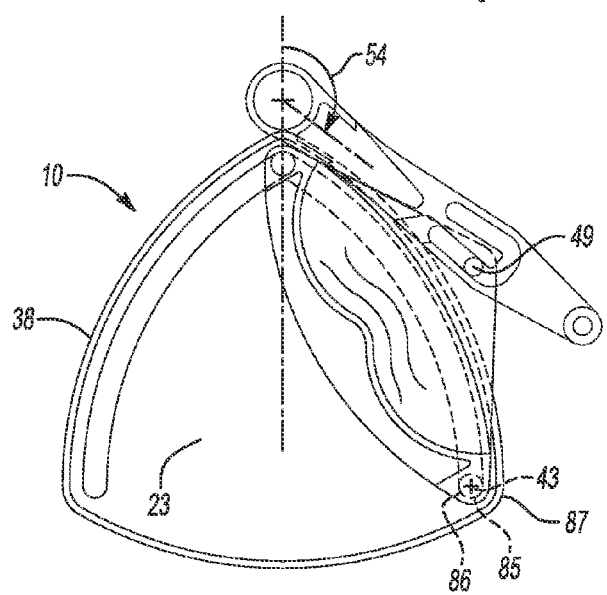
Fig-12A

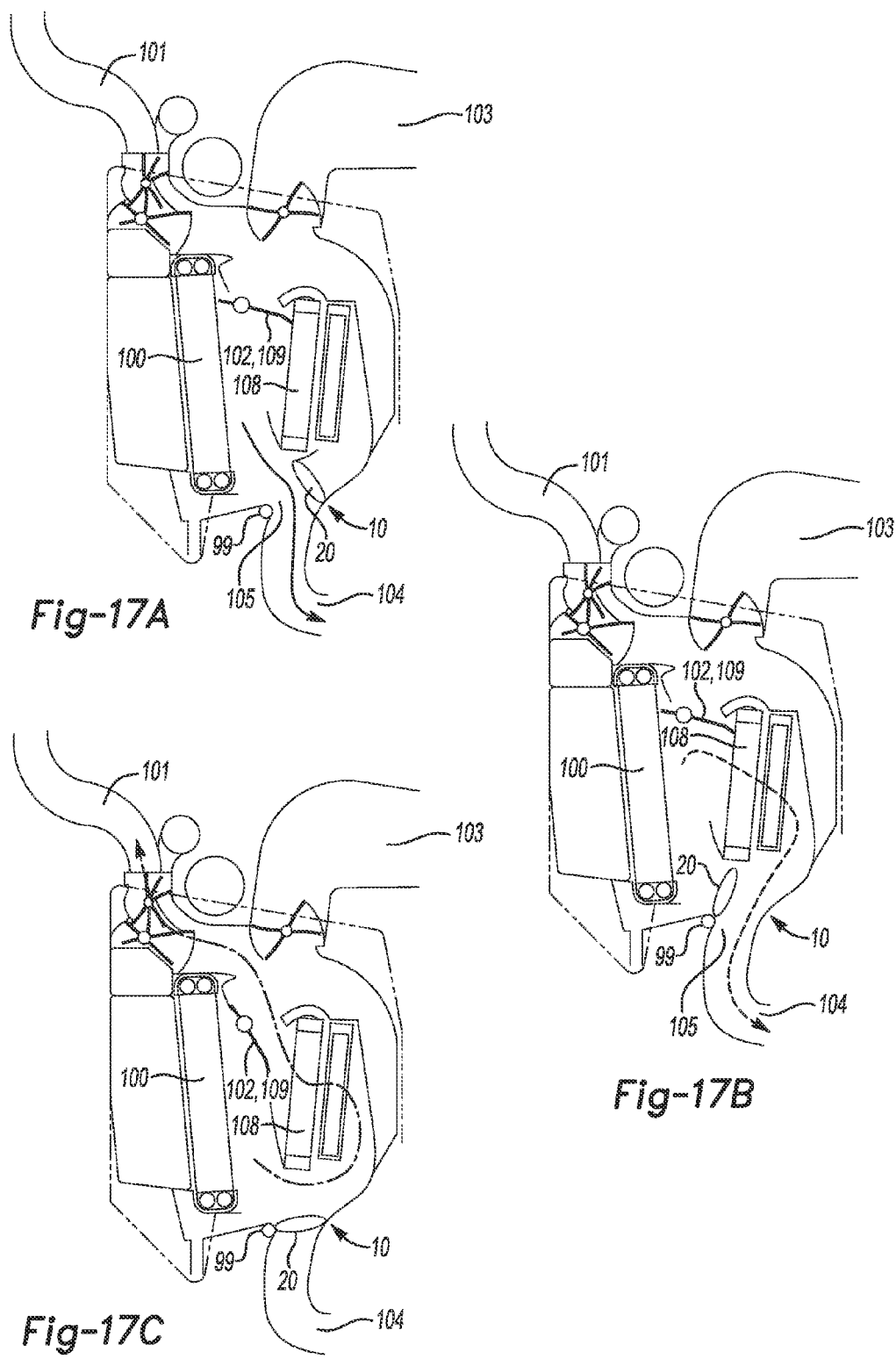

VALVE

BACKGROUND

HVAC (Heating Ventilation and Air Conditioning) systems are used for climate control of, e.g., internal cabin areas of an automobile. HVAC systems may be configured with an HVAC unit having a heat exchanger disposed in a housing. An HVAC distribution system may be operatively connected to the HVAC unit. An HVAC system may have one or more air flow paths for allowing air to flow, for example, to, from, and/or within the HVAC unit and the HVAC distribution system. Doors may be associated with the air flow path for controlling the amount of air flowing to, through, and/or from the HVAC unit and/or the HVAC distribution system.

SUMMARY

A valve includes a housing defining a flow path having three ports. A door in the flow path selectably controls a flow through the flow path in response to a rotation of a lever. Three seal flanges, each define one of the three ports. The door has three selectable closed positions including a first port closed position, a second port closed position, and a third port closed position. A resilient seal is compressed between a sealing face of the door and each of the three seal flanges respectively in turn when the door is in each of the closed positions. The door has a first pivot axis and a second pivot axis parallel to and spaced from the first pivot axis. The door is alternatively rotatable about the first pivot axis and the second pivot axis to selectably close, each individually and separately in turn, the three ports.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

FIG. 4B is a perspective view of the example of the portion of the HVAC housing and valve depicted in FIG. 4A with a portion of the HVAC housing removed to reveal detail of the example of the door according to the present disclosure;

FIG. 5A is a perspective component view of an example of a second portion of a housing according to the present disclosure;

FIG. 5B is a perspective component view of an example of a first portion of a housing according to the present disclosure;

FIG. 6A depicts a third port sealed state, FIG. 6B depicts a first port sealed state, and FIG. 6C depicts a second port sealed state;

FIGS. 10A-10D are semi-schematic cross-sectional views depicting examples of flow states in an HVAC system with one inlet and two outlets controlled by a valve according to the present disclosure, where FIG. 10A depicts flow to a first outlet open and flow to a second outlet blocked, FIG. 10B depicts flow to the second outlet open and flow to the first outlet blocked, FIG. 10C depicts flow from the inlet blocked, and FIG. 10D depicts flow from the inlet split between the first outlet and the second outlet;

FIGS. 11A-11F are semi-schematic cross-sectional views depicting examples of flow states in an HVAC system with two inlets and one outlet controlled by a valve according to the present disclosure, where FIG. 11A depicts flow from the first inlet open and flow from the second inlet open with flow to the outlet open, FIG. 11B depicts flow from the first inlet blocked and flow from the second inlet to the outlet open, FIG. 11C depicts flow from the first and second inlets to the outlet open, FIG. 11D depicts flow from the second inlet blocked and flow from the first inlet to the outlet open, FIG. 11E depicts flow from the first inlet to the outlet open and flow from the second inlet restricted, and FIG. 11F depicts flow from the outlet blocked and flow from the first inlet and the second inlet stalled;

FIGS. 12A-12E are a series of semi-schematic cross-sectional views depicting kinematics of an example of a valve of the present disclosure, where FIG. 12A depicts the example of the valve in a third port sealed state, FIG. 12B depicts the example of the valve at about 20% between the third port sealed state and the first port sealed state, FIG. 12C depicts the example of the valve at about 50% between the third port sealed state and the first port sealed state, FIG. 12D depicts the example of the valve at about 75% between the third port sealed state and the first port sealed state, and FIG. 12E depicts the valve at about 90% between the third port sealed state and the first port sealed state;

FIG. 13A depicts the valve with the lever at a counterclockwise dwell angle from the first port sealed angle, FIG. 13B depicts the valve with the lever at the first port sealed angle, FIG. 13C depicts the valve with the lever at a clockwise dwell angle from the first port sealed angle, FIG. 13D depicts the valve at about 25% between the first port sealed state and the second port sealed state, FIG. 13E depicts the valve at about 80% between the first port sealed state and the second port sealed state, and FIG. 13F depicts the valve at the second port sealed state;

FIG. 17A is a semi-schematic cross-sectional view of a portion of an HVAC system with a valve of the present disclosure directing cool air to a rear passenger zone of a vehicle;

FIG. 17B is a semi-schematic cross-sectional view of the portion of the HVAC system depicted in FIG. 17A except depicting the valve of the present disclosure directing heated air to the rear passenger zone of the vehicle;

FIG. 17C is a semi-schematic cross-sectional view of the portion of the HVAC system depicted in FIG. 17A except depicting the valve of the present disclosure blocking air flow to the rear passenger zone of the vehicle and allowing the air to pass through the valve to the heater;

DETAILED DESCRIPTION

Fluid flow in a duct may be controlled by a valve. In an example, the fluid may be air, and the duct may be part of an HVAC system. An HVAC system operably disposed in an automobile may be compact and lightweight. Valves may control a flow of air through the HVAC system. The valves in an HVAC system may be doors.

Figure 1A:
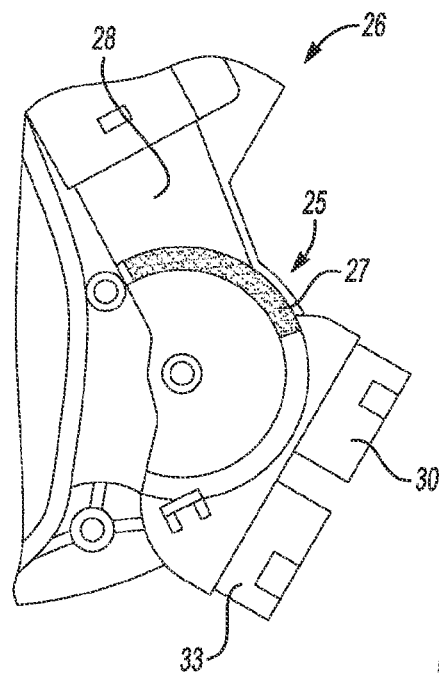
FIGS. 1A-1C semi-schematically depict a cross-section of an existing barrel-door valve in an HVAC (Heating Ventilation and Air Conditioning) system.
Figure 1B:
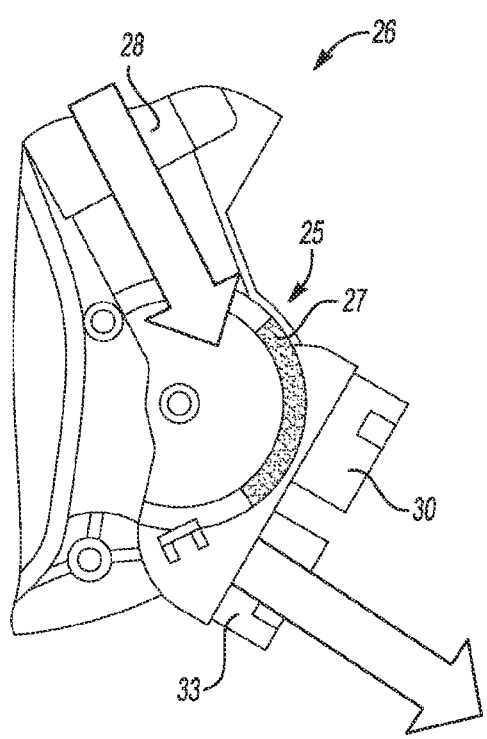
Figure 1C:
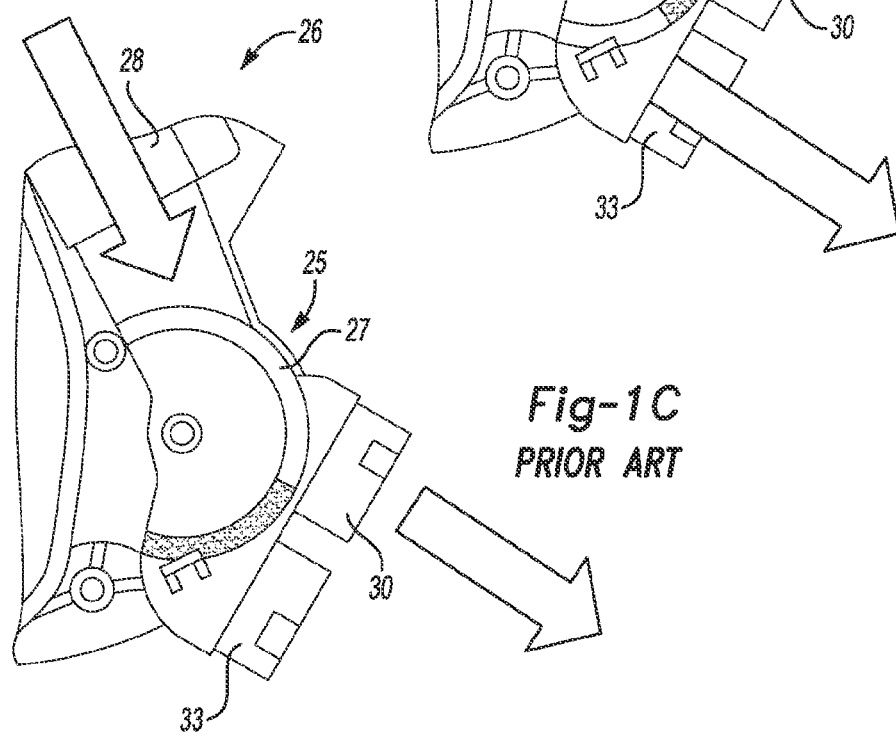

FIGS. 1A-1C semi-schematically depict a cross-section of an existing barrel-door valve 25 in an HVAC system 26. The barrel-door 27 in FIGS. 1A-1C rotates through three positions. FIG. 1A depicts the barrel-door 27 in a position to close an inlet duct 28. FIG. 1B depicts the barrel-door 27 in a position to block a flowpath to a duct 30 leading to a vent. As used herein, a vent means a duct having an outlet that projects air toward the head of an occupant in a normal seated position in a seat of the vehicle. In FIG. 1B, the ducts 28 that guide inlet airflow and the duct 33 that guides airflow to the floor are open. In FIG. 10, the barrel-door 27 is in a position to block a flowpath to the duct 33 leading to the floor. In FIG. 1C, the ducts 28 that guide inlet airflow and the duct 30 that guides airflow to the vent are open. If the barrel-door 27 has seals to reduce leakage of the airflow around the barrel-door 27, friction caused by the seals increases the torque to turn the barrel-door 27. Friction and shear forces imparted on the sliding seal depicted in FIGS. 1A-1C may cause reduction in the durability of the seal system compared to non-sliding, or compression seals. Further, differences between static friction and sliding friction, as well as the indeterminate nature of the loading make precise control of the barrel-door motion by an automatic actuator relatively difficult. Still further, sliding seals may be more expensive than compressive seals.

Figure 2A:
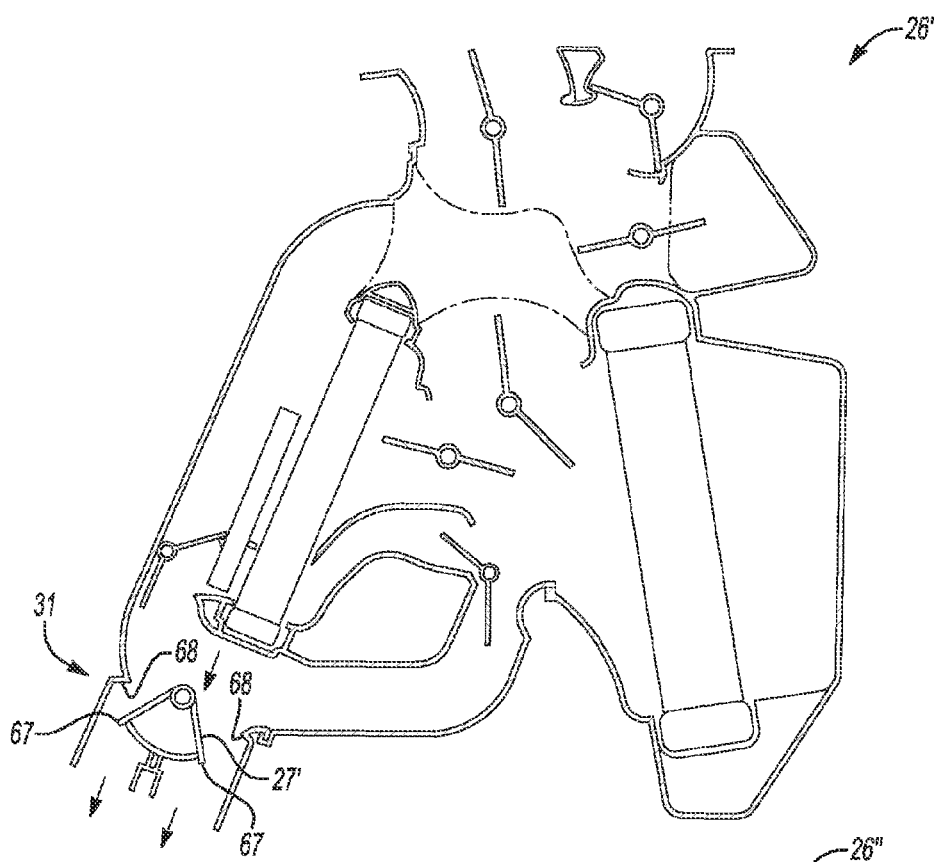
FIG. 2A semi-schematically depicts a cross-section of an existing 2-position door valve to control flow through two ports in an HVAC system.

FIG. 2A semi-schematically depicts a cross-section of an existing 2-position door valve 31 to control flow through two ports in an HVAC system 26'. Unlike the barrel-door 27 depicted in FIGS. 1A-1C, the barrel-door 27' in FIG. 2A has flanges 67 that engage a complementary seal seat 68 to form a compressive seal. There is no seal drag between sealed positions in FIG. 2A. The barrel-door 27' shown in FIG. 2A is limited to two sealed positions. For example, the barrel-door 27' may seal in a clockwise position or a counter-clockwise position. In order to achieve 3 position flow control, a second two-position door (e.g. a butterfly door, a flag door, or another 2-position door valve 31) would be required.

Figure 2B:
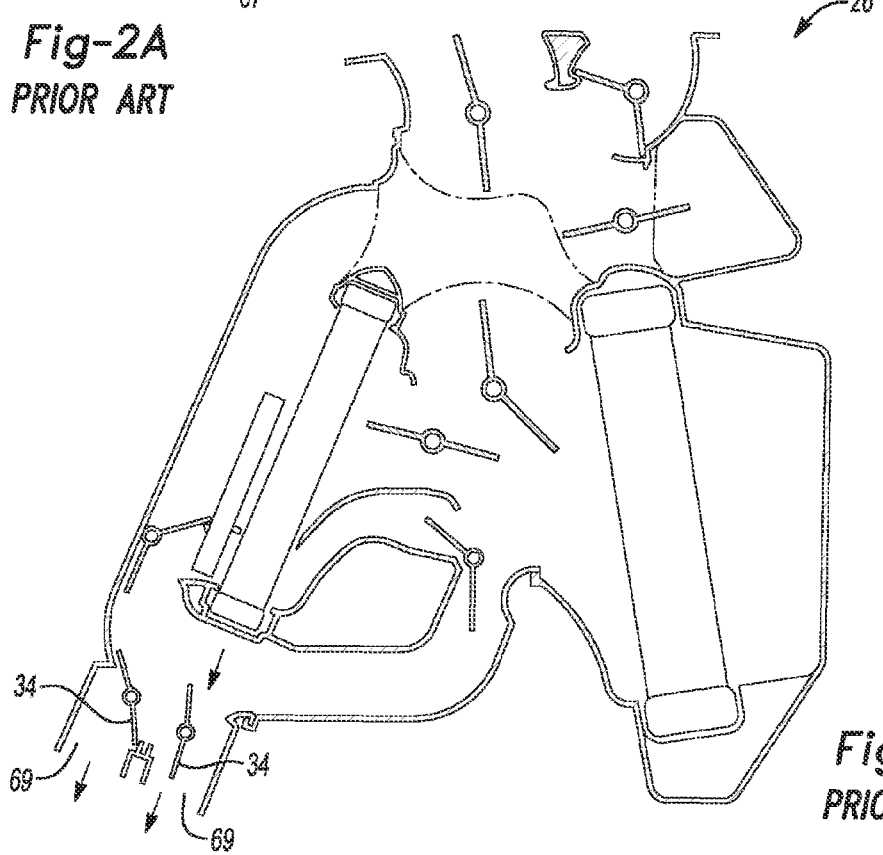
FIG. 2B semi-schematically depicts a cross-section of an existing HVAC system with two butterfly valves to control flow through two ports in an HVAC system.

FIG. 2B semi-schematically depicts a cross-section of an existing HVAC system 26" with two butterfly valves 34 to control flow through two ports 69 in the HVAC system 26". The butterfly valves 34 engage compressive seals without seal drag through most of the rotational range of the butterfly valves 34. Further the butterfly valves 34 depicted occupy space in the airflow, potentially causing undesirable turbulence, pressure drop, and noise. The HVAC system 26" with two butterfly valves 26" is more complex than the single barrel door in the HVAC system 26' depicted in FIG. 2A because the HVAC system 26' includes not only an additional door (butterfly valve 34), but also includes at least one mechanical link (not shown) to control motion of the additional butterfly valve 34.

Figure 3:
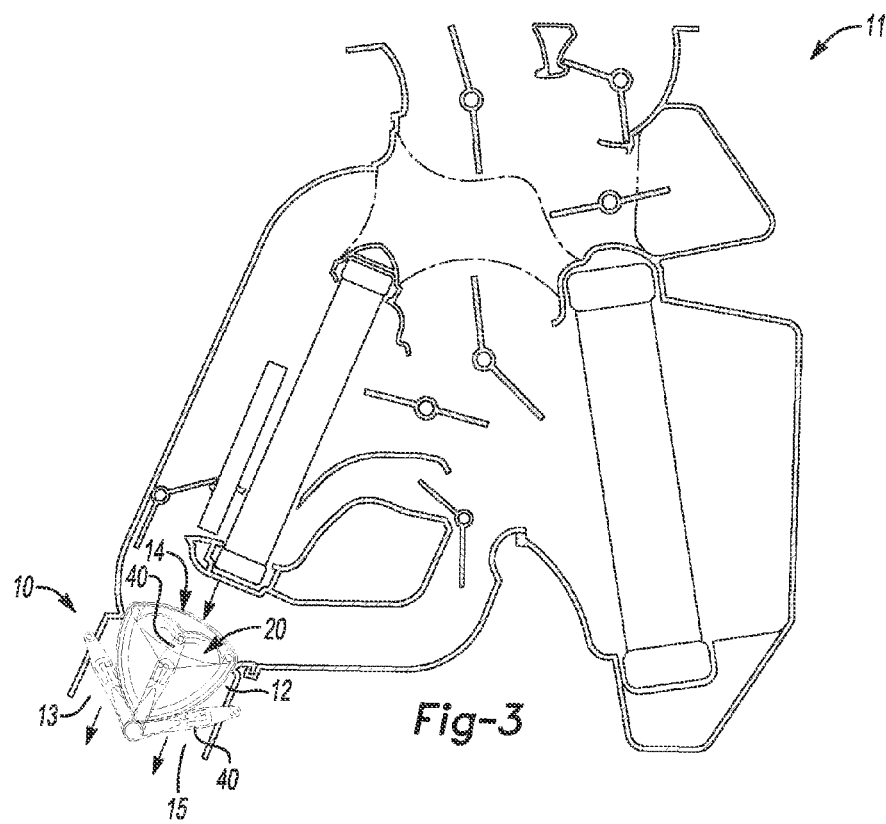
FIG. 3 semi-schematically depicts a cross section of an example of a valve of the present disclosure in an HVAC system.

FIG. 3 semi-schematically depicts a cross section of an example of a valve 10 of the present disclosure in an HVAC system 11. In the example depicted in FIG. 3, the valve 10 includes a housing 12 defining a fluid flow path having a first port 14, and a second port 15, and a third port 13. It is to be understood that in examples of the present disclosure, the ports 13-15 may be inlets or outlets. The first port 14, second port 15 and third port 13 are used herein to give differentiation and a more precise understanding of the figures as examples. As such, examples of the valve 10 of the present disclosure may control flow through any three similarly positioned ports in any combination of flow directions. In the example depicted in FIG. 3, a door 20 is disposed in the fluid flow path to selectably control a flow of fluid through the flow path in response to a rotation of a lever 40.

Figure 4A:
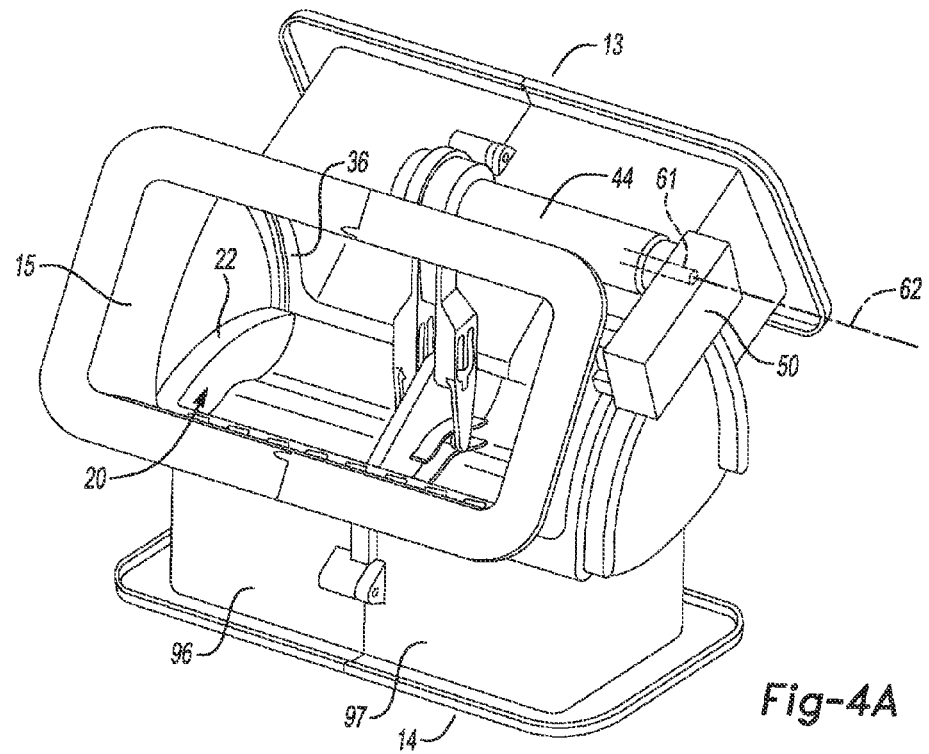
FIG. 4A is a perspective view of an example of portion of an HVAC housing with an example of a valve operatively disposed therein according to the present disclosure.

FIG. 4A is a perspective view of an example of portion of an HVAC housing with an example of a valve 10 operatively disposed therein according to the present disclosure. As shown in the example depicted in FIG. 4A, the valve may include a rotary actuator 50 having an output shaft 61 with an output shaft axis of rotation 62. The output shaft 61 is connected to an axle 44 for rotation therewith. The output shaft axis of rotation 62 is coaxial with the axle 44. The rotary actuator 50 may be, for example, an electric motor, a vacuum motor, an electric solenoid driving a crank, or any suitable rotary actuator 50.

The housing includes a first portion 96 of the housing to fit together with a second portion 97 of the housing. FIG. 4B is a perspective view of the example of the portion of the HVAC housing and valve 10 depicted in FIG. 4A with the second portion 97 of the HVAC housing removed to reveal detail of the example of the door 20 according to the present disclosure. FIG. 5A is a perspective component view of the second portion 97 of the housing depicted in FIG. 4A. FIG. 5B is a perspective component view of the first portion 96 of the housing depicted in FIG. 4A.

As seen in FIGS. 4A, 4B, and 5A, three seal flanges 36, 37, 38 each define a respective perimeter of the third port 13, the first port 14, and the second port 15. The door 20 has three dosed positions including a third port dosed position (see FIG. 6A), a first port closed position (see FIG. 6B), and a second port dosed position (see FIG. 6C). A resilient seal 21 is compressed between a sealing face 22 of the door 20 and each of the three seal flanges 36, 37, 38 respectively in turn when the door 20 is in each of the dosed positions.

Figure 6A:
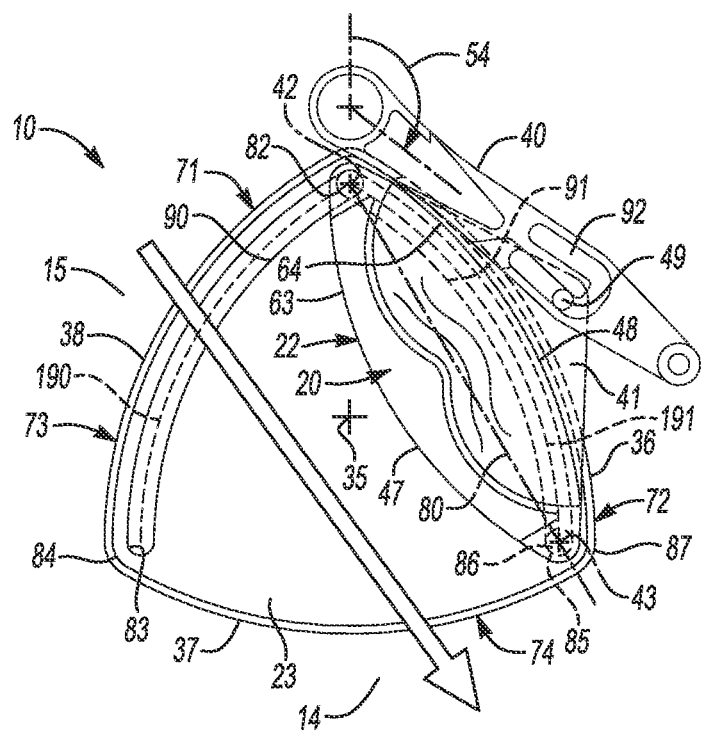
FIGS. 6A-6C are semi-schematic cross-sectional views depicting examples of valve states according to the present disclosure, where
Figure 6B:
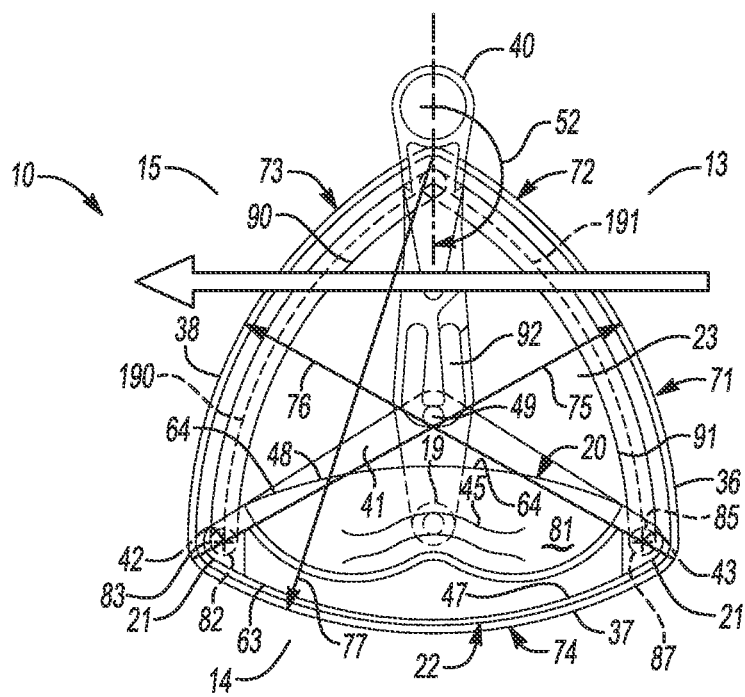
Figure 6C:
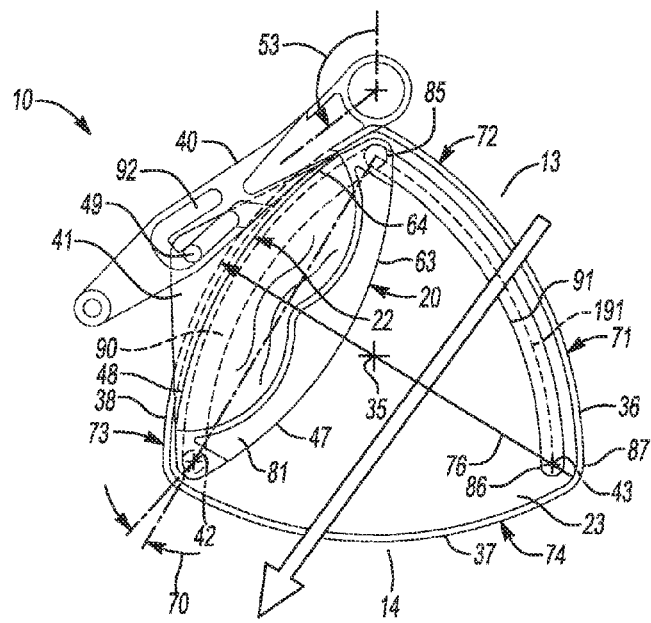

FIGS. 6A-6C are semi-schematic cross-sectional views depicting examples of valve states according to the present disclosure. FIG. 6A depicts a third port sealed state. In FIG. 6A, the large flow direction arrow depicts a flowpath from the second port 15 through the first port 14. FIG. 6B depicts the first port sealed state. In FIG. 6B, the large flow direction arrow depicts flow from the third port 13 through the second port 15. FIG. 6C depicts the second port sealed state. In FIG. 6C, the large flow direction arrow depicts flow from the third port 13 through the first port 14.

Referring to FIGS. 6A-6C, the door 20 has a first pivot axis 42 and a second pivot axis 43 parallel to and spaced from the first pivot axis 42. The door 20 is alternatively rotatable about the first pivot axis 42 and the second pivot axis 43 to selectably close, each individually and separately in turn, the first port, the second port, and the third port. Alternatively rotatable, as used herein, means that the door is rotatable about the first pivot axis 42 and the second pivot axis 43, however, not at the same time.

The first pivot axis 42 traverses a first circular arc 190 in the rotation of the door 20 about the second pivot axis 43. The second pivot axis 42 traverses a second circular arc 191 in the rotation of the door 20 about the first pivot axis 42. As used herein, "in the rotation" means during the rotation of the door 20. As used herein, "traverses" means translates along.

In the example of the valve 10 depicted in FIGS. 6A-6C, the three seal flanges 36, 37, 38 define a door operation pocket 23 having a central axis 35. In the example, a cross-section of the door operation pocket 23 cut by a plane perpendicular to the central axis 35 defines a Reuleaux triangle 71. It is to be understood that the arcs 72, 73, 74 of the door operation pocket 23 may have a respective radius 75, 76, 77 that is greater or smaller than a perfect Reuleaux triangle. The door 20 has a first pivot axis 42 parallel to the central axis 35. The door 20 has a second pivot axis 43 parallel to the first pivot axis 42. The sealing face 22 has a first side 63 and a second side 64 opposite the first side 63. The first side 63 of the sealing face 22 has a first sealing edge 47 complementary to a first port seal flange 37. The first sealing edge 47 defines a perimeter of a segment of a right circular cylinder 78 having a center axis 79 parallel to the first pivot axis 42 (see FIG. 7).

Still referring to FIGS. 6A-6C, the second side 64 of the sealing face 22 has a second sealing edge 48 that mirrors the first sealing edge 47 about a plane 80 defined by the first pivot axis 42 and the second pivot axis 43. The second sealing edge 48 is complementary to a second port seal flange 38 and complementary to a third port seal flange 36. The door 20 has a core 81 to prevent the fluid from flowing through a space bounded by the first sealing edge 47 and the second sealing edge 48.

Figure 7:
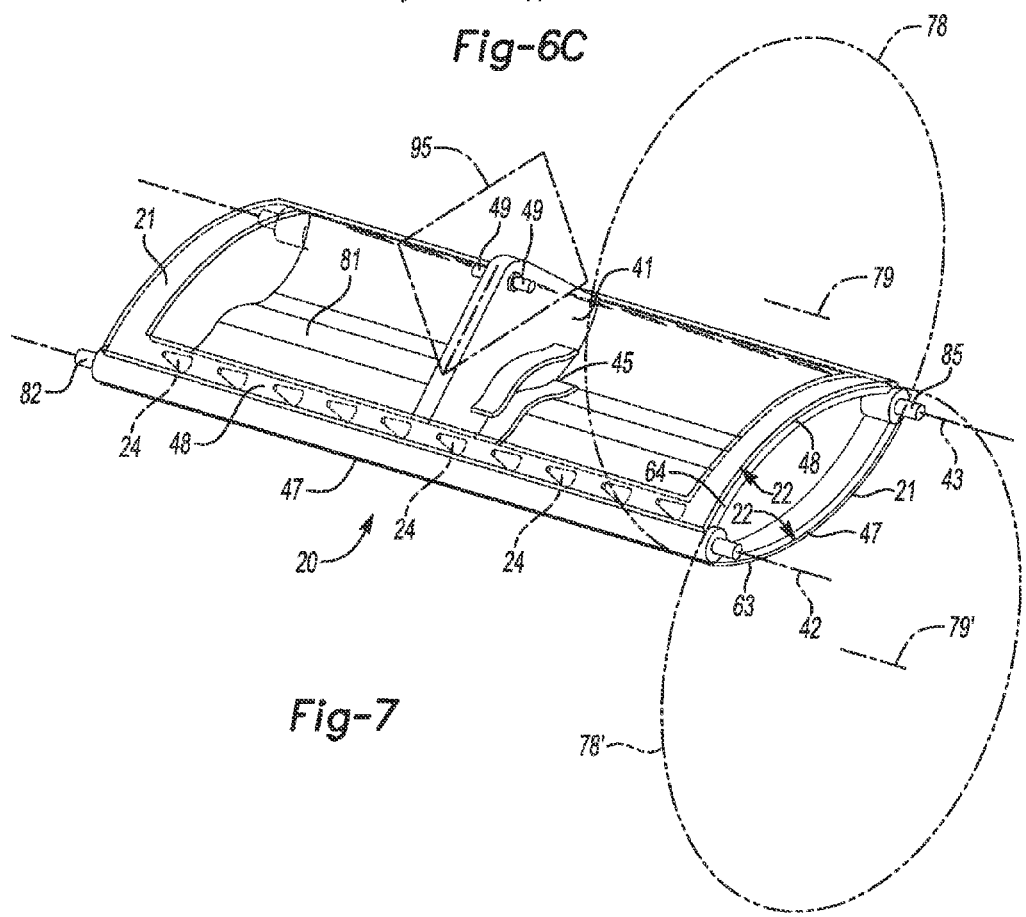
FIG. 7 is a perspective component view of an example of a door according to the present disclosure.

FIG. 7 is a perspective component view of an example of a door 20 according to the present disclosure. As described above, the example of the door 20 depicted in FIG. 7 has a first pivot axis 42 parallel to the central axis 35. The door 20 has a second pivot axis 43 parallel to the first pivot axis 42. The sealing face 22 has a first side 63 and a second side 64 opposite the first side 63. The first side 63 of the sealing face 22 has a first sealing edge 47 complementary to a first port seal flange 37. The first sealing edge 47 defines a perimeter of a segment of a right circular cylinder having a center axis parallel to the first pivot axis 42.

The second side 64 of the sealing face 22 has a second sealing edge 48 that mirrors the first sealing edge 47 about a plane defined by the first pivot axis 42 and the second pivot axis 43. The door 20 has a core to prevent the fluid from flowing through a space bounded by the first sealing edge 47 and the second sealing edge 48.

The door 20 has a crank arm 41 extending from the core. The crank arm 41 has a cylindrical post 49 extending from a surface of the crank arm 41. The cylindrical post 49 is parallel to the first pivot axis 42. A cam track 45 is defined by the crank arm 41 to guide a cam portion 19 of the lever 40 (see, e.g., FIG. 12D and FIG. 12E). A first portion of the resilient seal 21 is disposed on the first side 63 of the sealing face 22 continuously along the first sealing edge 47. A second portion of the resilient seal 21 is disposed on the second side 64 of the sealing face 22 continuously along the second sealing edge 48.

In an example, the resilient seal 21 may be a resilient material overmolded onto the door 20 as depicted in FIG. 7. The door 20 may include apertures 24 for the resilient material to flow through during the molding process. In another example, the resilient material may be attached to the door 20 using an adhesive.

Still referring to FIG. 7, a first portion of the resilient seal 21 is disposed on the first side 63 of the sealing face 22 of the door 20 continuously along the first sealing edge 47. A second portion of the resilient seal 21 is disposed on the second side 64 of the sealing face 22 continuously along the second sealing edge 48.

The resilient seal 21 is compressed between the sealing face 22 of the door 20 and the third port seal flange 36 to block fluid flow through the third port when the door 20 is in the third port sealed position (as depicted in FIG. 6A). Similarly, the resilient seal 21 is compressed between the sealing face 22 of the door 20 and the first port seal flange 37 to block fluid flow through the first port when the door 20 is in a first port sealed position (as depicted in FIG. 6B). When the door 20 is in a second port sealed position (as depicted in FIG. 6C), the resilient seal 21 is compressed between the sealing face 22 of the door 20 and the second port seal flange 38 to block fluid flow through the second port.

Still referring to FIG. 7, the door 20 has a crank arm 41 extending from the core 81. The crank arm 41 has a cylindrical post 49 extending from a surface of the crank arm 41. The cylindrical post 49 is parallel to the first pivot axis 42. The cam track 45 is defined by the crank arm 41 to guide the cam portion 19 of the lever 40 (see, e.g., FIG. 12O).

In an example, the door 20 may include a first bearing surface 82 defined at a first contact 83 (see FIG. 6A) between the door 20 and the housing at a first vertex 84 of the door operation pocket 23 opposite the third port seal flange 36 (see FIG. 6A). The first bearing surface 82 is to guide the door 20 in rotation about the first pivot axis 42 when the door 20 moves between the first port closed position and the second port closed position (see FIGS. 13C-13F).

Figure 13A:
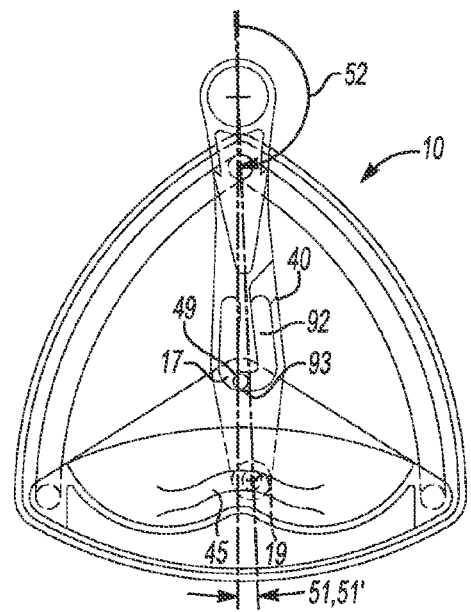
FIGS. 13A-13F continue the series of FIGS. 12A-12E, depicting kinematics of an example of a valve of the present disclosure, where
Figure 13B:
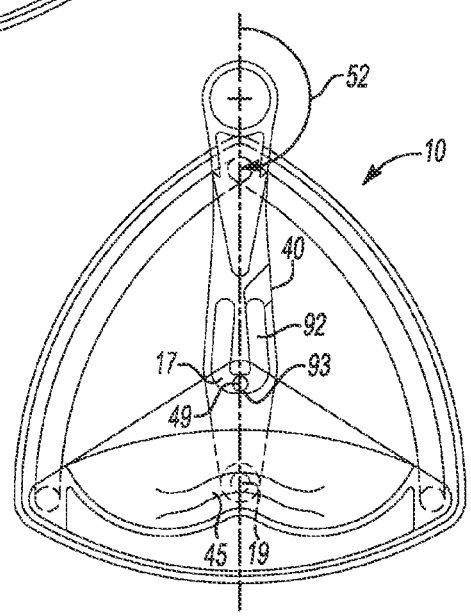
Figure 13C:
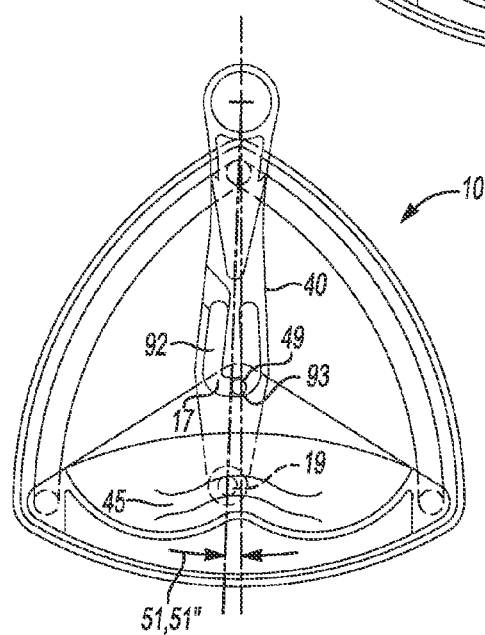
Figure 13D:
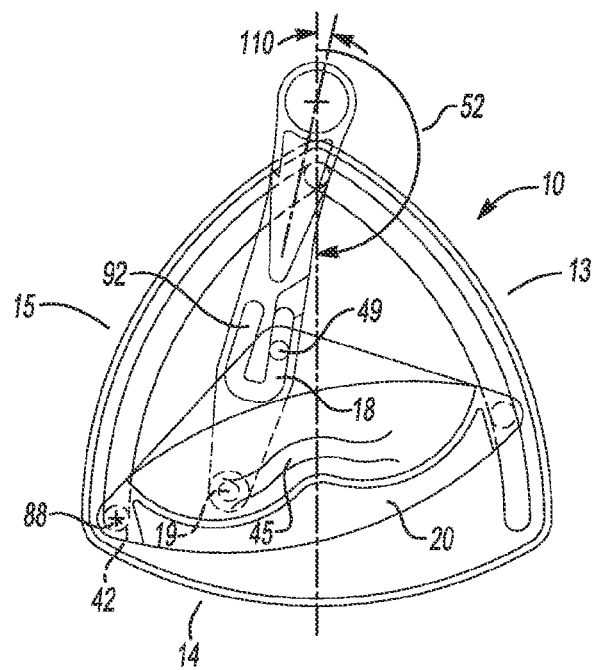
Figure 13E:
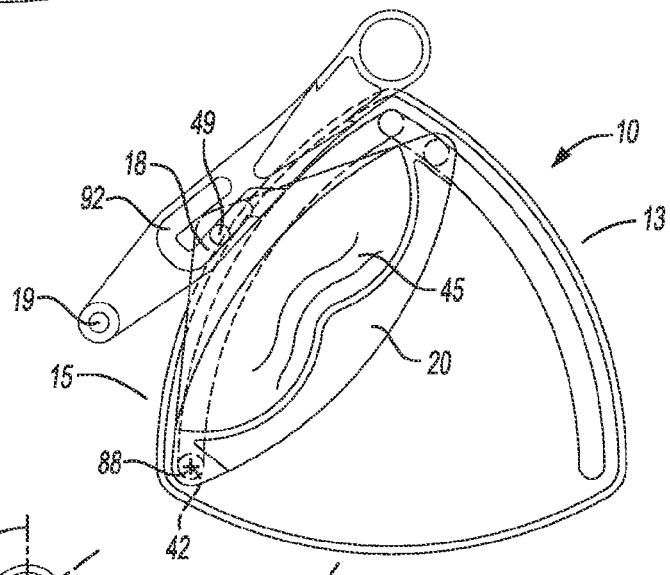

As depicted in FIGS. 13D and 13E, the door 20 is rotatable about the first pivot axis 42 to selectably adjust a first proportion of opening between the first port 14 and the second port 15. For example, if the third port 13 depicted in FIG. 13O is an inlet, then about 25 percent of the flow will be directed through an outlet corresponding to the first port 14 and about 75 percent of the flow will be directed through another outlet corresponding to the second port 15. In this example, it is assumed that the proportion of flow is about the same as the first proportion of opening between the first port 14 and the second port 15. Similarly, if the third port 13 depicted in FIG. 13E is an inlet, about 80 percent of the flow will be directed through the outlet corresponding to the first port 14 and about 20 percent of the flow will be directed through the other outlet corresponding to the second port 15.

As depicted in FIGS. 12A-12E, the door 20 may further include a second bearing surface 85 defined at a second contact 86 between the door 20 and the housing at a second vertex 87 of the door operation pocket 23 opposite the second port seal flange 38. The second bearing surface 85 is to guide the door 20 in rotation about the second pivot axis 43 when the door 20 moves between the first port closed position and the third port closed position (see FIGS. 12A-12E). The first bearing surface 82 and the second bearing surface 85 may include a portion of the resilient seal 21 (see FIG. 12E).

Figure 12B:
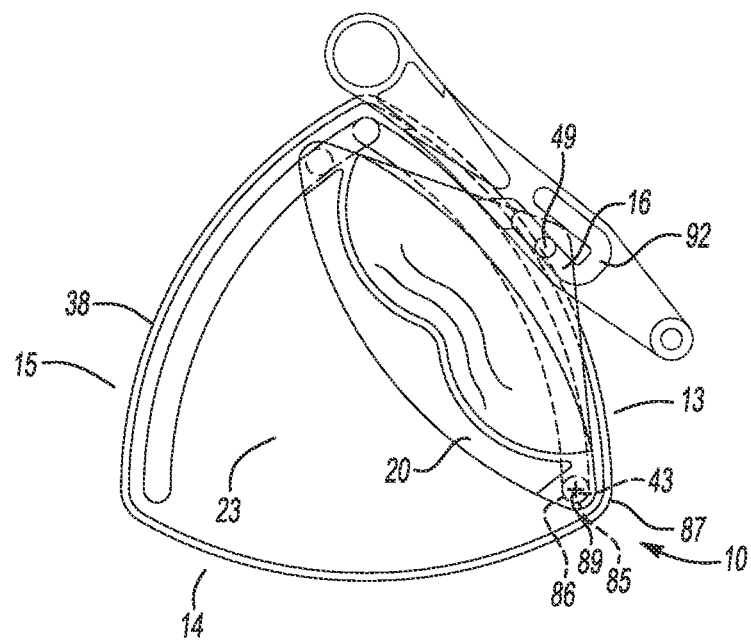
Figure 12C:
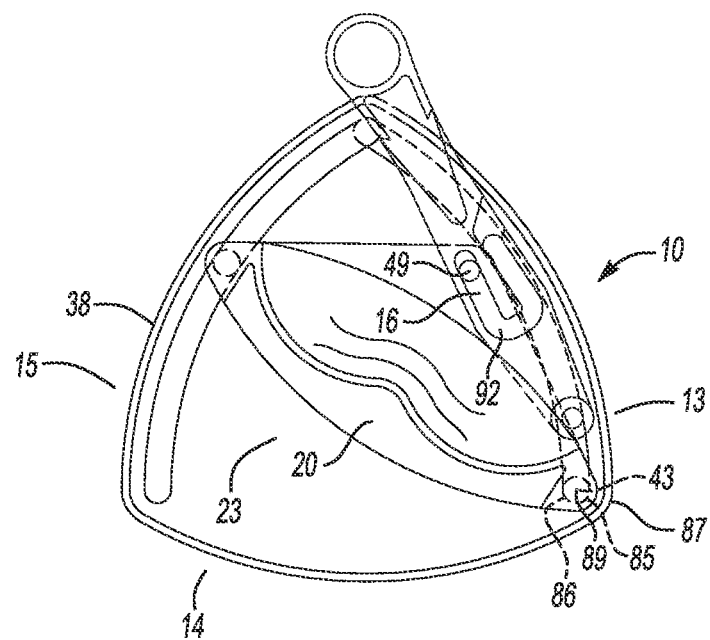
Figure 12D:
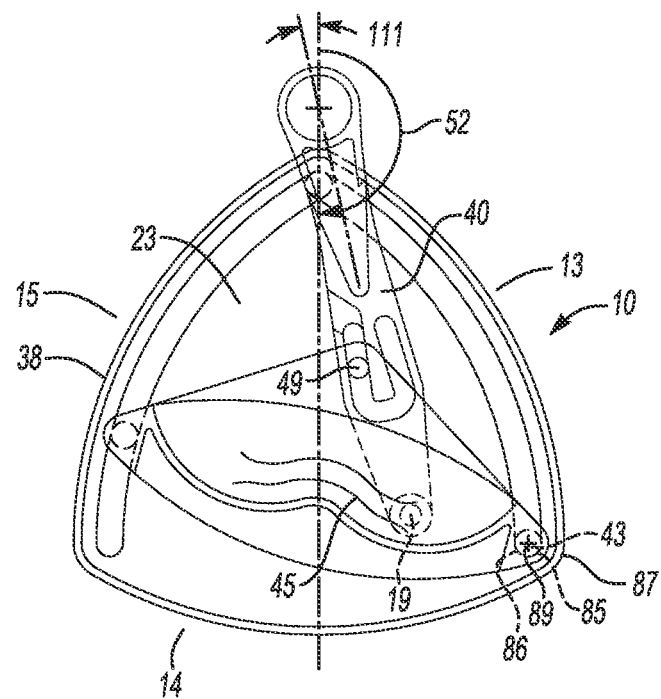
Figure 12E:
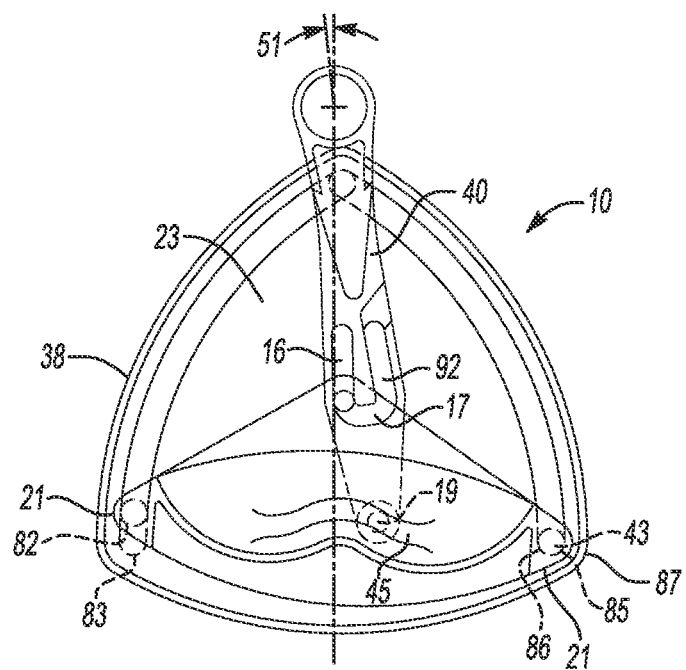

As depicted in FIGS. 12B and 12E, the door 20 is rotatable about the second pivot axis 43 to selectably adjust a second proportion of opening between the first port 14 and the third port 15. For example, if the second port 15 depicted in FIG. 12B is an inlet, then about 20 percent of the flow will be directed through an outlet corresponding to the third port 13, and about 80 percent of the flow will be directed through another outlet corresponding to the first port 14. In this example, it is assumed that the proportion of flow is about the same as the second proportion of opening between the third port 13 and the first port 14. Similarly, if the second port 15 depicted in FIG. 12C is an inlet, about 50 percent of the flow will be directed through the outlet corresponding to the third port 13 and about 50 percent of the flow will be directed through the other outlet corresponding to the first port 14.

Figure 8:
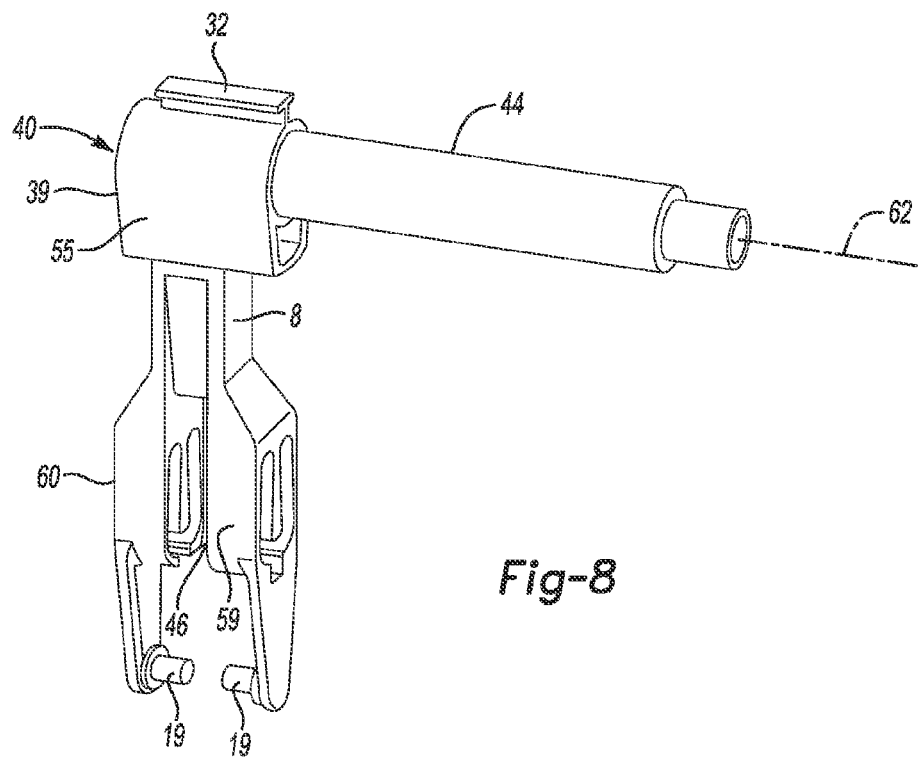
FIG. 8 is a perspective component view of an example of a lever according to the present disclosure.
Figures 15A, 15B, 15C:
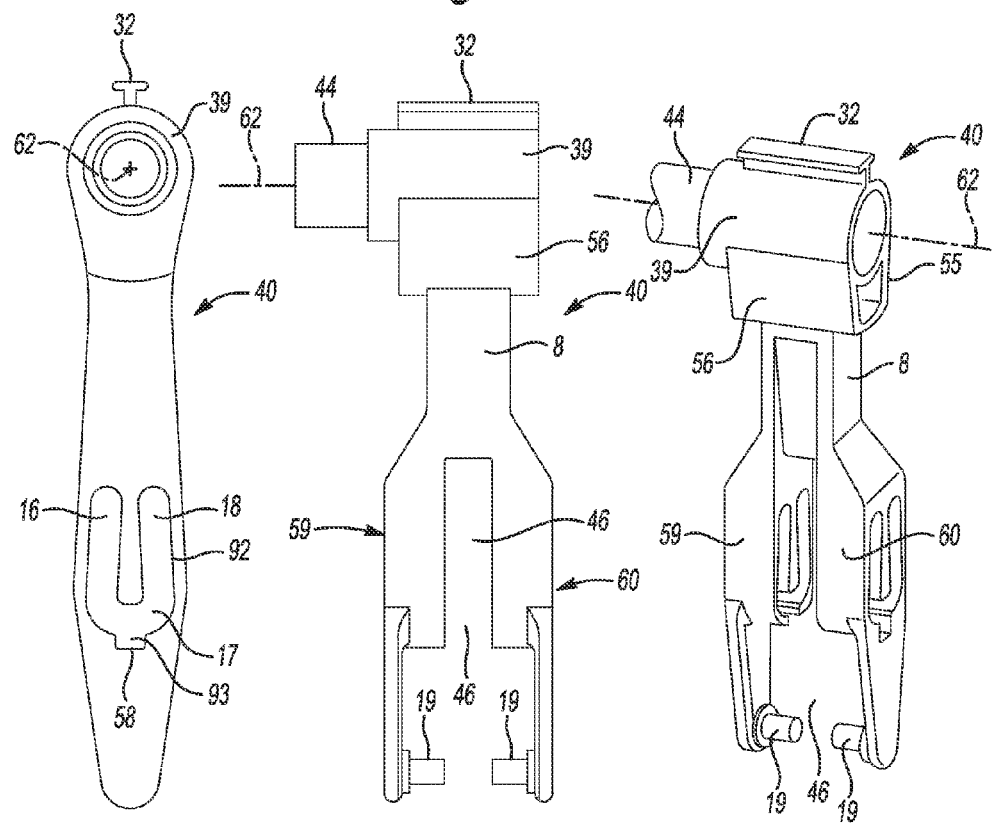
FIG. 15A is a side view of an example of the lever according to the present disclosure.
FIG. 15B is an end view of the example of the lever depicted in FIG. 15A.
FIG. 15C is a perspective view of the example of the lever depicted in FIG. 15A.

Following the same pattern, if the second port 15 depicted in FIG. 12O is an inlet, about 75 percent of the flow will be directed through the outlet corresponding to the third port 13 and about 25 percent of the flow will be directed through the other outlet corresponding to the first port 14. FIG. 8 is a perspective component view of an example of a lever 40 according to the present disclosure. FIGS. 15A-15C are other views of the example of the lever 40 depicted in FIG. 8. The lever 40 is to pivot about an axle 44. In an example, the lever 40 may rotate relative to the axle 44, or the axle 44 may be fixed for rotation with the axle 44. The axle 44 extends from the head 39 of the lever 40. A flange 32 with a T-shaped cross-section extends parallel to the axle 44 axis of rotation. The flange 32 fills a gap 9 (see FIG. 16D) between the lever 40 and the housing to prevent fluid from leaking through the gap 9 when the lever 40 is at the third port sealed angle 54 and the second port sealed angle 53. The lever 40 has a first bridge plate 55 and a second bridge plate 56 on opposed sides of the head 39. The first and second bridge plates 55, 56 are formed into the head 39 opposite to the flange 32. The first bridge plate 55 is to extend across the first notch 65 (see FIG. 16B) in the third port seal flange 36 to present a first substantially continuous surface to the resilient seal 21 with the third port seal flange 36 when the door 20 is in the third port sealed position to prevent fluid from bypassing the door 20 (see FIG. 16C). The second bridge plate 56 is to extend across the second notch 66 (see FIG. 16A) in the second port seal flange 38 to present a second substantially continuous surface to the resilient seal 21 with the second port seal flange 38 (as depicted in FIG. 16C) when the door 20 is in the second port sealed position to prevent fluid from bypassing the door. The lever 40 further includes a narrow body portion 8 extending from the head 39.

The example of the lever 40 depicted in FIGS. 8 and 15A-15C includes a central slot 46 to receive the crank arm 41. The central slot 46 is defined between a first leg 59 and a second leg 60 of the lever 40. The first leg 59 has symmetrically opposite geometry of the second leg 60. A U-shaped track 92 is defined in each leg. The U-shaped track 92 has a first branch 16 and a second branch 18. The first branch 16 and the second branch 18 extend linearly along a radial line through the axle axis of rotation 62. In an example, the first branch 16 and the second branch 18 may deviate from parallel to the radial line through the axle axis of rotation 62 by up to about 2 degrees. A curved portion 17 of the U-shaped track 92 joins the first branch 16 to the second branch 18. A relief notch 58 is defined at a center of the curved portion 17 on a distal end. The relief notch 58 provides clearance to the cylindrical post 49 when the lever 40 is within a dwell angle 51 of the first port sealed angle 52. A cam portion 19 is defined at an end of the first leg 59 and an end of the second leg 60. In the example depicted in FIGS. 8, 15B and 15C, the cam portion 19 is a short, cylindrical shaft that extends from the respective leg toward the central slot 46. As stated above, the cam portions 19 are mirror images of each other. As used herein, a short shaft means a shaft having a ratio of the length of the cylindrical shaft to the diameter of the cylindrical shaft less than about 5.

In the example depicted in FIG. 15B, the lever 40 includes a central slot 46 to receive the crank arm 41. The central slot 46 is defined between a first leg 59 and a second leg 60 of the lever 40. The first leg 59 has symmetrically opposite geometry of the second leg 60. As shown in FIG. 15B, the first leg 59 is a mirror image of the second leg 60. The crank arm 41 (see e.g. FIG. 7 and FIG. 14) has bilateral symmetry about a medial plane 95 orthogonal to the axle 44. The bilateral symmetry of the crank arm 41 at least applies to the cylindrical post 49 and the cam track 45. As such, there is a cylindrical post 49 projecting from opposite sides of the crank arm 41. Similarly, there is a cam track 45 disposed on each of the opposed faces of the crank arm 41. A resultant vector of forces applied by the lever 40 on the crank arm 41 lies in the medial plane 95. Specifically, the forces are applied between each cylindrical post 49 and the corresponding U-shaped track 92 of the lever 40 and between each cam portion 19 and the corresponding cam track 45. The symmetry causes eccentric loading to be cancelled out, yielding the resultant force vector that lies in the medial plane. The resultant force vector in the medial plane 95 produces no torque out of the medial plane 95. A torque out of the medial plane 95 may require compensation (e.g., with stiffness or bearings) to reduce twisting of the door 20 in the door operation pocket 23 and binding.

Figure 9:
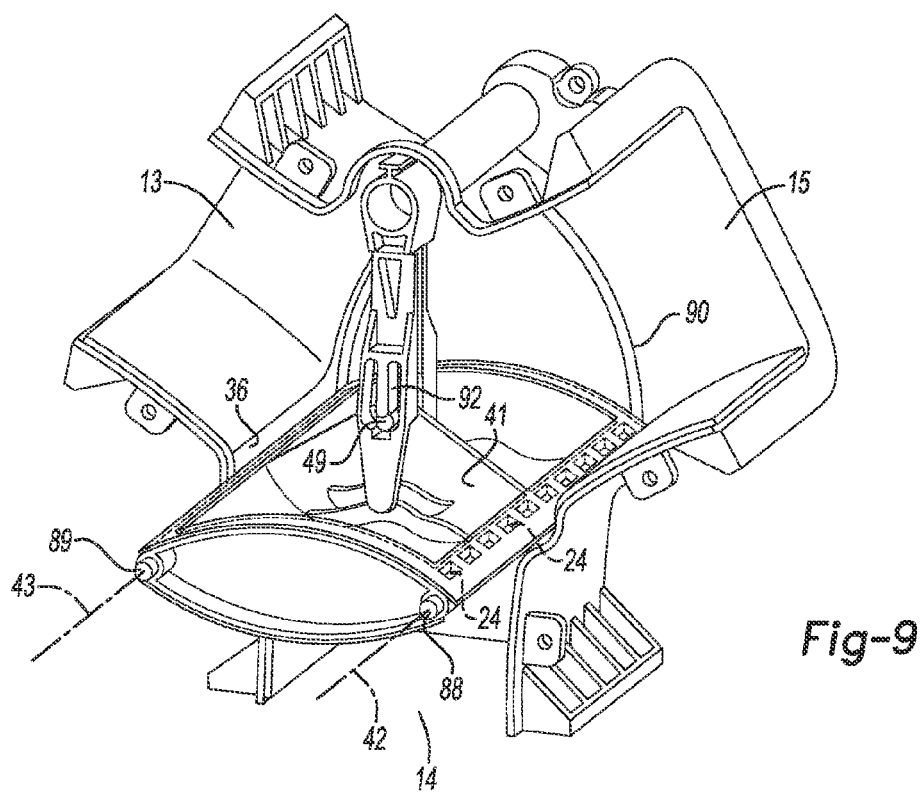
FIG. 9 is a rear perspective view of a partial valve assembly including the example of the second portion of the housing depicted in FIG. 5A, the example of the door depicted in FIG. 7, and the example of the lever depicted in FIG. 8.

FIG. 9 is a rear perspective view of a partial valve assembly including the example of the first portion of the housing depicted in FIG. 5A, the example of the door 20 depicted in FIG. 7, and the example of the lever 40 depicted in FIG. 8. The resilient seal 21 is not shown in FIG. 9. The valve is shown with the lever 40 and door 20 in positions corresponding to the first port sealed state.

Referring to FIG. 9 and FIGS. 6A-6C together, note that FIG. 9 is a view from the opposite end shown in FIGS. 6A-6C. In the example depicted, the door 20 includes a first stub shaft 88 disposed thereon coaxial to the first pivot axis 42. The first stub shaft 88 projects away from the door 20. The housing includes a first groove 90 to receive the first stub shaft 88. The first groove 90 is to guide the first stub shaft 88 in a path along the first circular arc 190 parallel to a second port seal arc portion of the second port seal flange 38. The door 20 includes a second stub shaft 89 disposed thereon coaxial to the second pivot axis 43. The second stub shaft 89 projects away from the door. The housing includes a second groove 91 to receive the second stub shaft 89. The second groove 91 is to guide the second stub shaft 89 in a path along the second circular arc 191 parallel to a third port seal arc portion of the third port seal flange 36.

In the example depicted in FIGS. 9 and 6A-6C, the lever 40 defines a U-shaped track 92 to engage the cylindrical post 49. The lever 40 applies tension via the U-shaped track 92 to the cylindrical post 49 to pull on the crank arm 41 to urge the door 20 to the third port sealed position with a force along a line between the cylindrical post 49 and a centroid of the third port seal flange 36 when the door 20 is in the third port sealed position and the lever 40 is rotated to a third port sealed angle 54. The lever 40 applies compression via the cam portion 19 to the cam track 45 to push on the crank arm 41 to urge the door 20 to the first port sealed position with a force along a line between the cam portion 19 and a centroid of the first port seal flange 37 when the door 20 is in the first port sealed position and the lever 40 is rotated to a first port sealed angle 52. The lever 40 applies tension via the U-shaped track 92 to the cylindrical post 49 to pull on the crank arm 41 to urge the door 20 to the second port sealed position with a force along a line between the cylindrical post 49 and a centroid of the second port seal flange 38 when the door 20 is in the second port sealed position and the lever 40 is rotated to a second port sealed angle 53.

FIGS. 10A-10D are semi-schematic cross-sectional views depicting examples of flow states in an HVAC system 11 with one inlet 3, a first outlet 4 and a second outlet 5 controlled by a valve 10 according to the present disclosure. The lever 40 and door 20 are represented by stick-figures that indicate relative positions; however, the shapes of the components in FIGS. 10A-100 are only rough approximations of actual shapes of the components. In FIGS. 10A-10D, the inlet 3 corresponds to the third port 13, the first outlet 4 corresponds to the first port 14, and the second outlet 5 corresponds to the second port 15. FIG. 10A depicts flow to the first outlet 4/first port 14 open and flow to the second outlet 5/second port 15 blocked. FIG. 10B depicts flow to the second outlet 5/second port 15 open and flow to the first outlet 4/first port 14 blocked. FIG. 10C depicts flow from the inlet 3/third port 13 blocked. FIG. 100 depicts flow from the inlet 3/third port 13 partially open to the first outlet 4/first port 14 and partially open to the second outlet 5/second port 15.

Figure 10E:
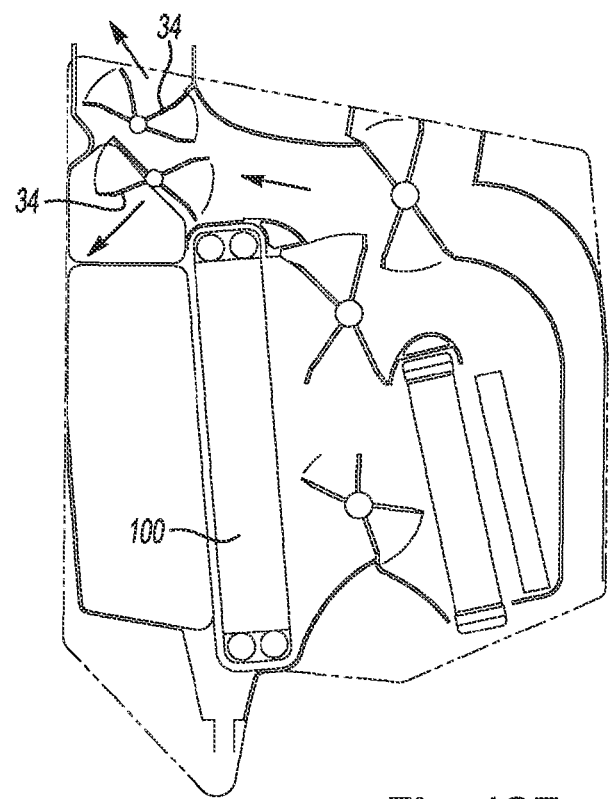
FIG. 10E is a semi-schematic cross-sectional view depicting an existing HVAC system with separate defrost and floor butterfly doors.
Figure 10F:
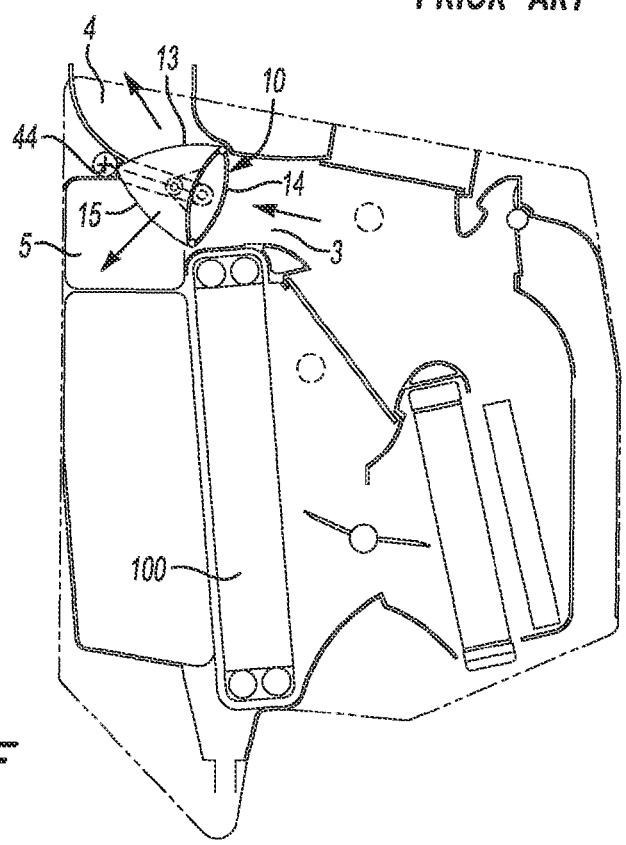
FIG. 10F is a semi-schematic cross-sectional view depicting an example of the present disclosure replacing the separate defrost and floor butterfly doors shown in FIG. 10E with the valve of the present disclosure.

An example of the present disclosure may be implemented as shown in FIG. 10F to simplify an HVAC unit and reduce part count compared to the existing HVAC unit depicted in FIG. 10E. The separate defrost and floor butterfly doors 34 shown in FIG. 10E are replaced with the valve 10 of the present disclosure, as illustrated in FIG. 10F. The existing defrost and butterfly doors 34 may partially obstruct the air flow path, even when open as shown in FIG. 10E. The valve 10 of the present disclosure does not have such an obstruction except in the case of blended flow (FIG. 10D), therefore improved airflow, noise and power consumption may be realized with the valve 10 of the present disclosure. Further, the lever 40 of the present disclosure does not occupy space in the airflow path.

The kinematic parts used to move the existing separate defrost and butterfly doors 34 consume valuable package space and add to the cost of the existing HVAC system. Examples of the present disclosure may reduce the overall package space required for the HVAC module. In examples of the present disclosure, the axle 44 that drives the lever 40 fits neatly in space that is normally available and not utilized.

Figure 11A:
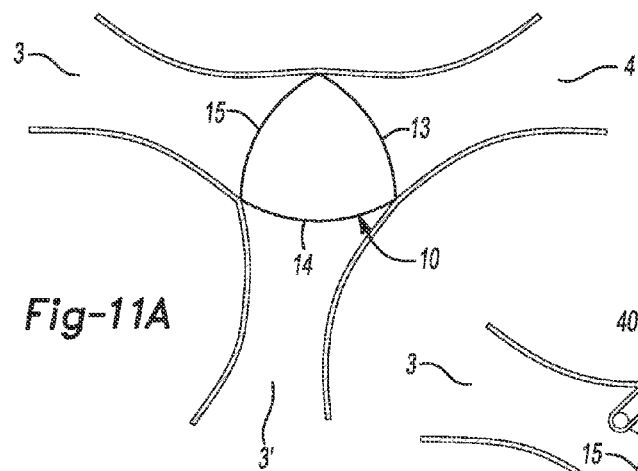
Figure 11B:
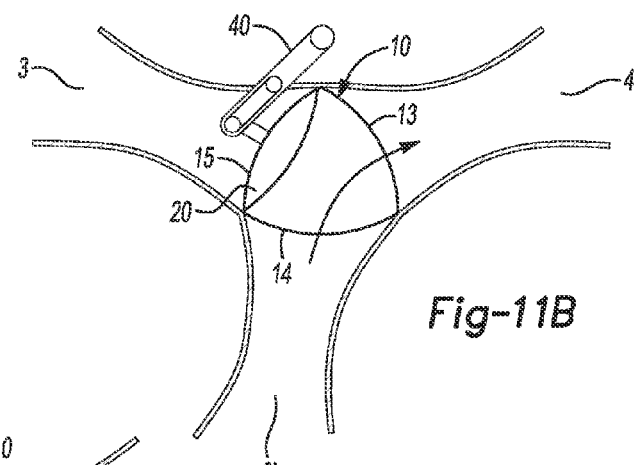
Figure 11C:
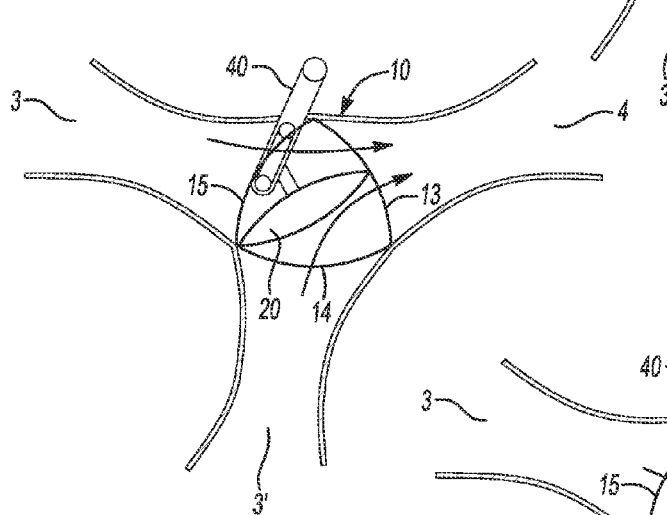
Figure 11D:
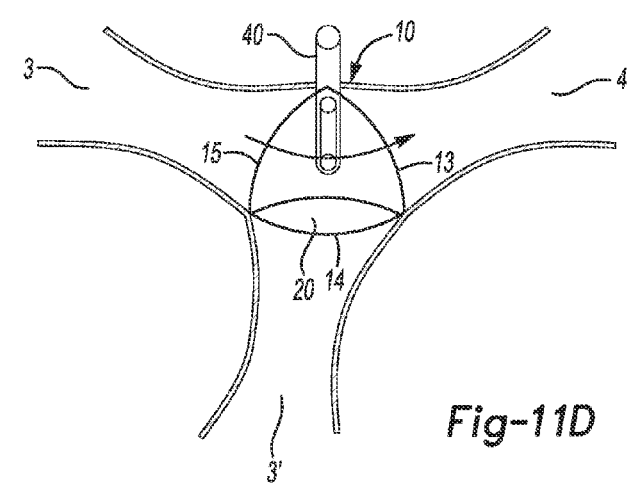

FIGS. 11A-11F are semi-schematic cross-sectional views depicting examples of flow states in an HVAC system 11' with two inlets 3, 3' and one outlet 4 controlled by a valve 10 according to the present disclosure. Similarly to FIGS. 10A-10D, the lever 40 and door 20 are represented by stick-figures that indicate relative positions, however, the shapes of the components in FIGS. 11A-11F are only rough approximations of actual shapes of the components. The positions of the inlets 3,3' and outlet 4 are different from those shown in FIGS. 10A-100. In FIGS. 11A-11F, the inlet 3 corresponds to the second port 15, the second inlet 3' corresponds to the first port 14, and the outlet 4 corresponds to the third port 13. FIG. 11A depicts the configuration of inlets, outlets and ports used in FIGS. 11B-D. To simplify the illustration, there is no door present in FIG. 11A. FIG. 11B depicts flow from the first inlet 3/second port 15 blocked and flow from the second inlet 3'/first port 14 to the outlet 4/third port 13 open. FIG. 11C depicts flow from the first inlet 3/second port 15 and from the second inlet 3'/first port 14 to the outlet 4/third port 13 open. FIG. 11D depicts flow from the second inlet 3'/first port 14 blocked and flow from the first inlet 3/second port 15 to the outlet 4 third port 13 open. FIG. 11E depicts flow from the first inlet 3/second port 15 to the outlet 4/third port 13 open and flow from the second inlet 3'/first port 14 restricted. FIG. 11F depicts flow to the outlet 4/third port 13 blocked and flow from the first inlet 3/second port 15 and the second inlet 3'/first port 14 stalled.

FIGS. 12A-12E are a series of semi-schematic cross-sectional views depicting kinematics of an example of a valve 10 of the present disclosure. FIG. 12A depicts the example of the valve 10 in a third port sealed state. The lever 40 is at the third port sealed angle 54. FIG. 123 depicts the example of the valve 10 at about 15% between the third port sealed state and the first port sealed state. The cylindrical post 49 is about midway along the first branch 16 of the U-shaped track 92. The door 20 pivots on the second stub shaft 89 about the second pivot axis 43. FIG. 12C depicts the example of the valve 10 at about 50% between the third port sealed state and the first port sealed state. The cylindrical post 49 is near the upper end of the first branch 16 of the U-shaped track 92. The door 20 pivots on the second stub shaft 89 about the second pivot axis 43. FIG. 12D depicts the example of the valve at about 75% between the third port sealed state and the first port sealed state. The cylindrical post 49 is about midway along the first branch 16 of the U-shaped track 92, and the cam portion 19 is positioned is at an entrance to the cam track 45. The door 20 pivots on the second stub shaft 89 about the second pivot axis 43. FIG. 12E depicts the valve 10 at about 90% between the third port sealed state and the first port sealed state. The cylindrical post 49 is transitioning between the first branch 16 and the curved portion 17 of the U-shaped track 92. The lever 40 is nearing the counterclockwise dwell angle 51' and the cam portion 19 is about one third of the way along the cam track 45.

Figure 13F:
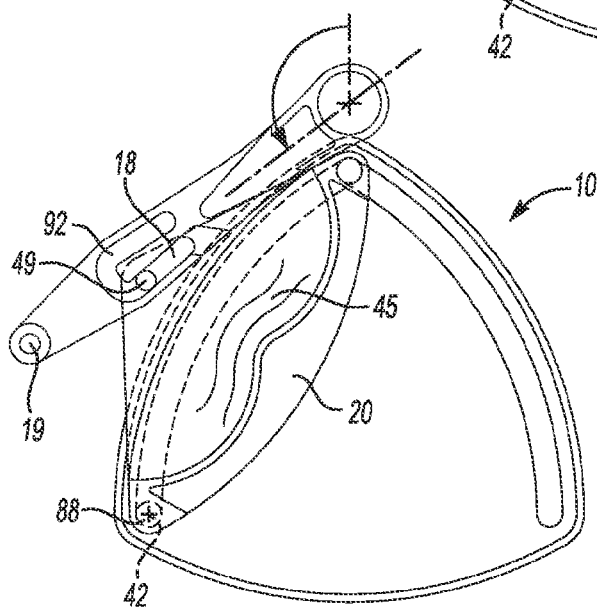

FIGS. 13A-13F continue the series of FIGS. 12A-12E, depicting kinematics of an example of a valve 10 of the present disclosure. FIG. 13A depicts the valve 10 with the lever 40 at a counterclockwise dwell angle 51' from the first port sealed angle 52. The cylindrical shaft 49 is to the left of center in the curved portion 17 of the U-shaped track 92. The cam portion 19 is to the right of center in the cam track 45. In FIG. 13A, the first port is sealed. FIG. 13B depicts the valve with the lever 40 at the first port sealed angle 52. The cylindrical shaft 49 is centered in the curved portion 17 of the U-shaped track 92. The cam portion 19 is also centered in the cam track 45. In FIG. 13B, the first port is sealed. FIG. 13C depicts the valve 10 with the lever 40 at a clockwise dwell angle 51" from the first port sealed angle 52. The cylindrical shaft 49 is to the right of center in the curved portion 17 of the U-shaped track 92. The cam portion 19 is to the left of center in the cam track 45. In FIG. 13C, the first port is sealed. FIG. 13D depicts the valve 10 at about 25% between the first port sealed state and the second port sealed state. The cylindrical post 49 is about midway along the second branch 18 of the U-shaped track 92 and the cam portion 19 is positioned is at an entrance to the cam track 45. The door 20 pivots on the first stub shaft 88 about the first pivot axis 42. FIG. 13E depicts the valve 10 at about 80% between the first port sealed state and the second port sealed state. The cam portion 19 has disengaged from the cam track 45. The door 20 pivots on the first stub shaft 88 about the first pivot axis 42. FIG. 13F depicts the valve 10 at the second port sealed state. The lever 40 is at the second port sealed angle 53.

As depicted in FIGS. 13A-13C, the interaction between the U-shaped track 92 and the cylindrical post 49 makes the valve 10 robust to variation in the rotation of the lever 40. In other words, the valve 10 seals when the lever 40 is close to the first port sealed angle 52. As depicted in FIG. 13B, the lever 40 is vertical when the lever 40 is at the first port sealed angle 52. The boundaries of closeness are defined by the dwell angle 51. The valve 10 remains sealed when the lever 40 is within the dwell angle 51 of the first port sealed angle 52. To prevent binding of the cylindrical post 49 or the cam portion 19, a clearance 93 is provided between the cylindrical post 49 and the U-shaped track 92 to correspond to the dwell angle 51. The U-shaped track 92 has a clearance 93 to the cylindrical post 49 when the lever 40 is within a dwell angle 51 of the first port sealed angle 52. In an example, the dwell angle 51 ranges from about 2 degrees to about 6 degrees. To be specific, the dwell angle 51 is applied bilaterally to the first port sealed angle 52. Therefore, the clearance is effective over an angle of twice the dwell angle 51 centered on the first port sealed angle 52. As shown in FIG. 15A, the clearance 93 may be provided by a relief notch 58 at the midpoint of the U-shaped track 92.

In an example, the cam engagement with the cam track 45 causes a torque to rotate the door 20 about the first pivot axis 42 when the lever 40 is rotated between the first port sealed angle 52 (see FIG. 13C) and a first cam release angle 110 (shown in FIG. 13D) between the first port sealed angle 52 and the second port sealed angle 53 (see FIG. 13F). The opposite occurs when the lever 40 is rotated between the first port sealed angle 52 and the third port sealed angle 54 (FIG. 12A). The cam engagement with the cam track 45 causes a torque to rotate the door 20 about the second pivot axis 43 when the lever 40 is rotated between the first port sealed angle 52 and a second cam release angle 111 (shown in FIG. 12D) between the first port sealed angle 52 and the third port sealed angle 54 (see FIG. 12A).

Figure 14:
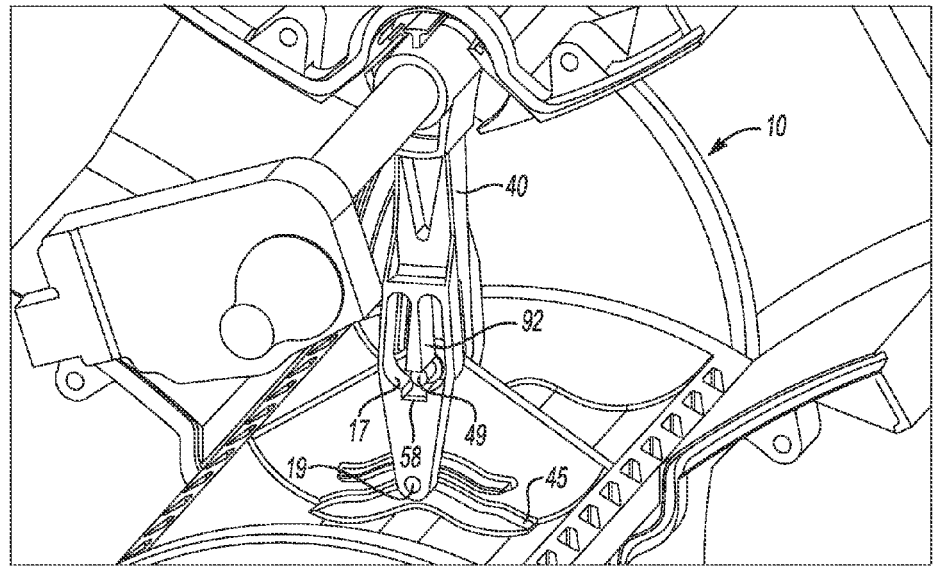
FIG. 14 is a cutaway perspective view depicting an example of the valve with the lever at the first port sealed angle according to the present disclosure.

FIG. 14 is a cutaway perspective view depicting an example of the valve at with the lever 40 at the first port sealed angle 52 according to the present disclosure. The cylindrical shaft 49 is centered in the curved portion 17 of the U-shaped track 92. The relief notch 58 gives clearance to the cylindrical shaft 49. The cam portion 19 is also centered in the cam track 45. In FIG. 14, the first port is sealed. The resilient seal 21 is not shown in FIG. 14.

Figure 16A:
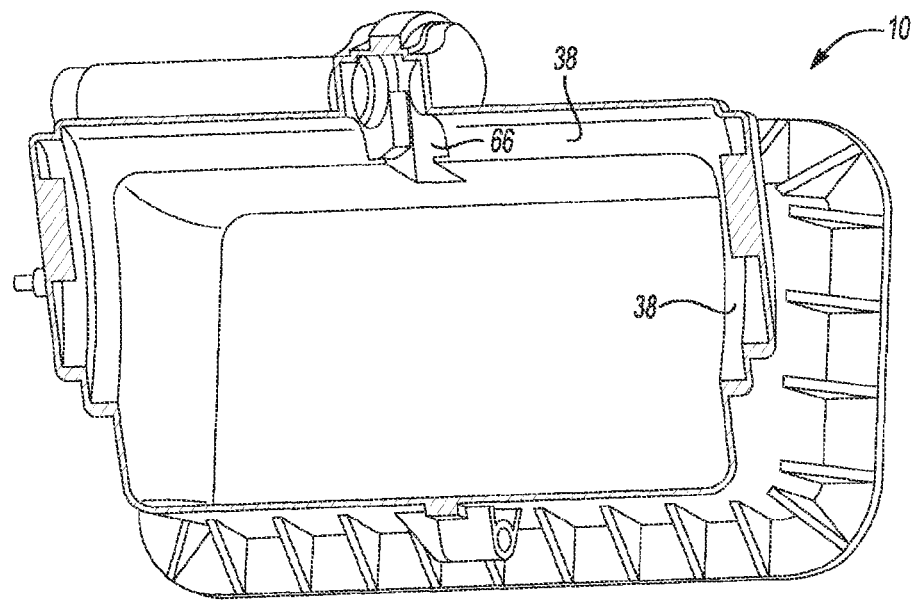
FIG. 16A is a perspective cut-away view of a portion of the housing of a valve according to the present disclosure depicting a notch to receive the lever.
Figure 16B:
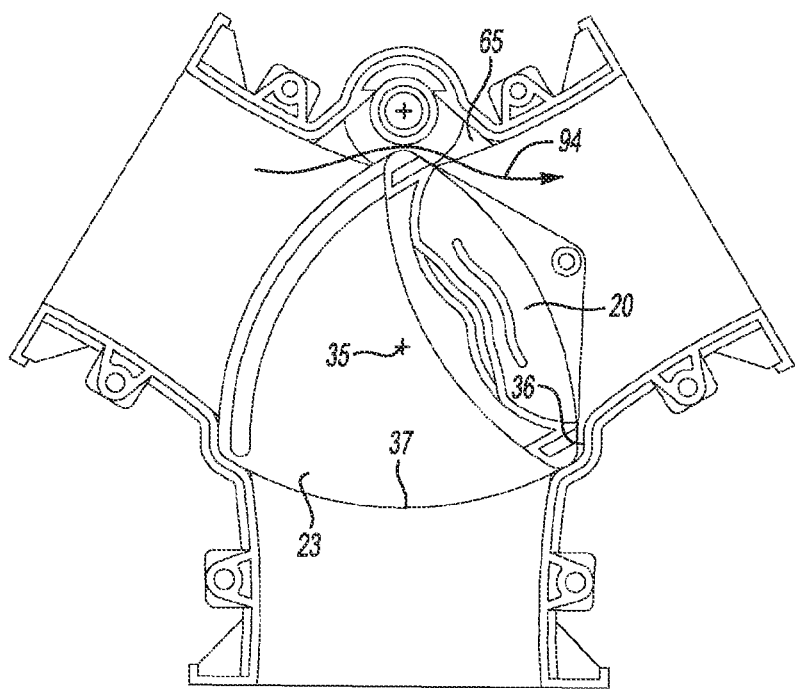
FIG. 16B is a semi-schematic side view of the housing of the present disclosure depicting a potential leak path, which is eliminated in the present disclosure because it is blocked by the lever.
Figure 16C:
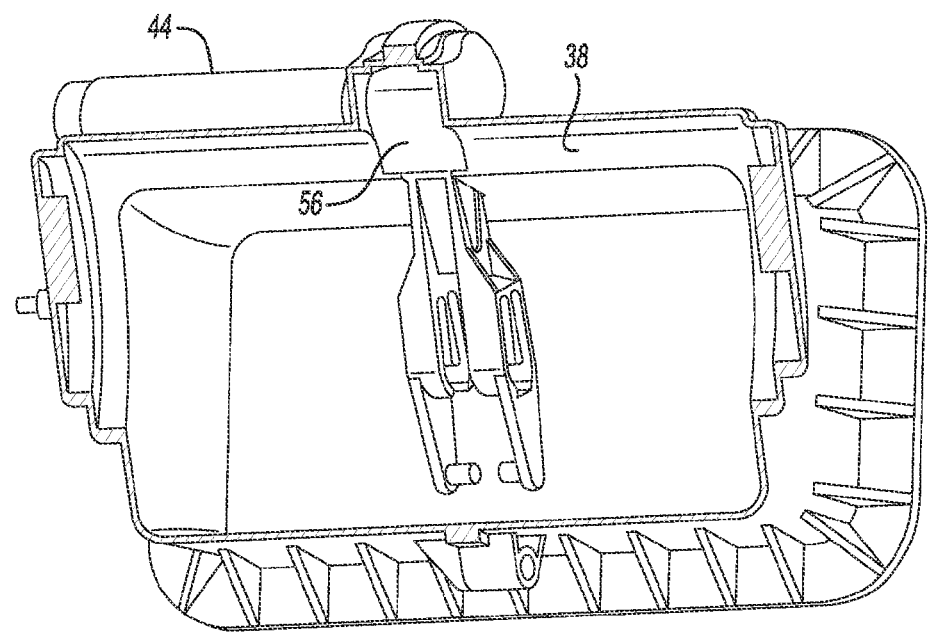
FIG. 16C is a semi-schematic side view of the housing of the present disclosure as depicted in FIG. 16A, with the lever shown forming a sealing surface with the second port seal flange according to the present disclosure.
Figure 16D:
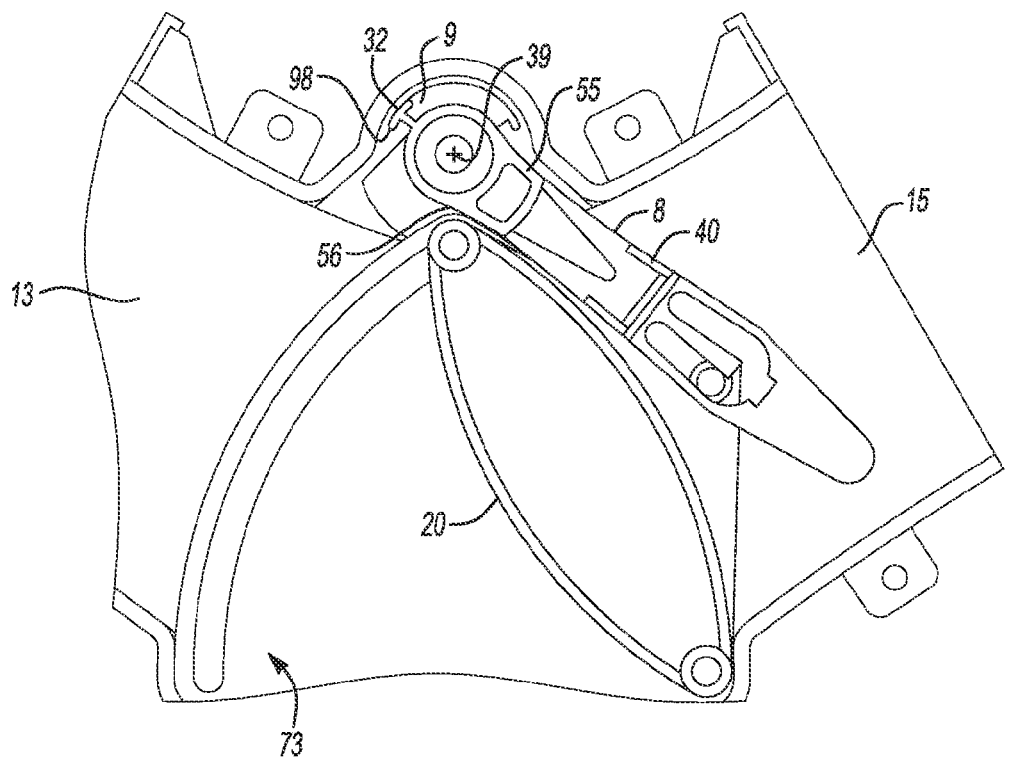
FIG. 16D is a side view of a portion of the view of FIG. 16B depicting the lever blocking the leak path according to the present disclosure.

FIG. 16A is a perspective cut-away view of a portion of the housing of a valve 10 according to the present disclosure depicting a second notch 66 to receive the lever 40. A portion of the second port seal flange 38 has been cut away in FIG. 16A. FIG. 16B depicts a potential leak path 94 to be blocked by the lever 40. The lever 40 is not shown in FIG. 16B. In FIG. 16O, the lever 40 is shown forming a sealing surface with the second port seal flange 38 according to the present disclosure. FIG. 16D is a side view of a portion of the view of FIG. 16B depicting the lever 40 blocking the leak path according to the present disclosure. The flange 32 with the T-shaped cross-section nests in a complementary groove 98 to restrict bypass airflow via a tortuous path with a small cross-sectional area.

In the example depicted in FIGS. 16A-16D, the lever 40 rotates about an axle 44 positioned radially outward of the door operation pocket 23 along a line through the central axis 35 and a second vertex of the door operation pocket 23 opposite the first port seal flange 37. The lever 40 substantially fills a first notch 65 in the third port seal flange 36 to present a first substantially continuous surface to the resilient seal 21 with the third port seal flange 36 when the door 20 is in the third port sealed position to prevent fluid from bypassing the door 20. Bypassing is indicated by flow arrow 94. When the door 20 is in the second port sealed position, to prevent fluid from bypassing the door, the lever 40 substantially fills a second notch 66 in the second port seal flange 38 to present a second substantially continuous surface to the resilient seal 21 with the second port seal flange 38.

FIG. 17A is a semi-schematic cross-sectional view of a portion of an HVAC system with a valve 10 of the present disclosure directing cool air to a rear passenger zone of a vehicle. In FIGS. 17A-17C, circle 99 represents the axle 44 that drives the lever 40. The air is cooled by flowing through the evaporator 100. A flapper door 102 prevents the cool air from being directed to the defroster duct 101 or the front vent duct 103. The valve 10 opens a heater core bypass 105 to the rear passenger duct 104.

FIG. 17B is a semi-schematic cross-sectional view of the portion of the HVAC system depicted in FIG. 17A except depicting the valve 10 of the present disclosure directing heated air to the rear passenger zone of the vehicle. The valve 10 blocks the heater core bypass 105; thereby forcing the air to flow through the heater core 108 and out through the rear passenger duct 104.

FIG. 17C is a semi-schematic cross-sectional view of the portion of the HVAC system depicted in FIG. 17A except depicting the valve 10 of the present disclosure blocking air flow to the rear passenger zone of the vehicle. The flapper door 102 is open to allow the air to flow through the heater core in the opposite direction (compared to the flow through the heater core in FIG. 17B) and exit to the defrost duct 101.

The example depicted in FIGS. 17A-17C provides a rear vent blend function and the rear vent shut-off function. Including the valve of the present disclosure simplifies the HVAC unit and reduces the package space to otherwise achieve the desired functionality of three positions: 1) cold, 2) hot; 3) defrost. The example depicted also provides a temperature blend function. In the example shown in FIGS. 17A-17C, the valve 10 works in conjunction with a defrost recovery door 109 to significantly reduce package space. FIGS. 17A-17C show only a center channel of the HVAC unit. Other doors and was are in sections outboard of the center channel shown. The valve 10 of the present disclosure is compact, requiring only a small amount of space beyond what is utilized for air flow passages. The axle 44 that drives the lever 40 fits into space that is normally available and not otherwise utilized.

Figure 18A:
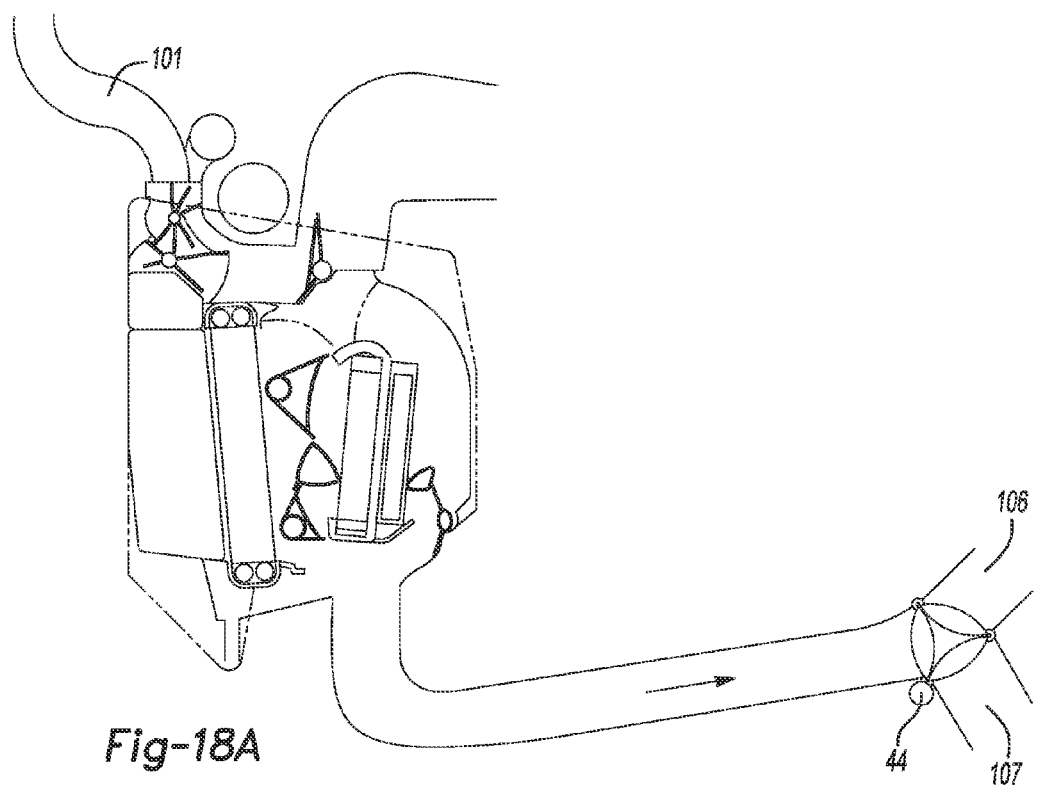
FIG. 18A is a semi-schematic cross-sectional view of a portion of an HVAC system with a valve of the present disclosure to selectively direct flow to a rear vent or rear floor of a passenger vehicle.
Figure 18B:
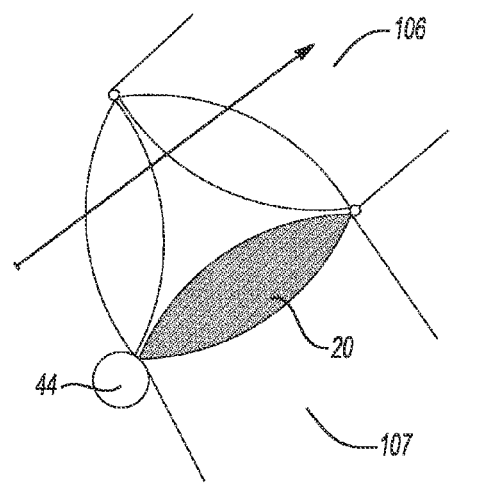
FIG. 18B is a semi-schematic detail view of the valve depicted in FIG. 18A with the valve blocking the rear floor duct and allowing air to flow through to the rear vent duct.
Figure 18C:
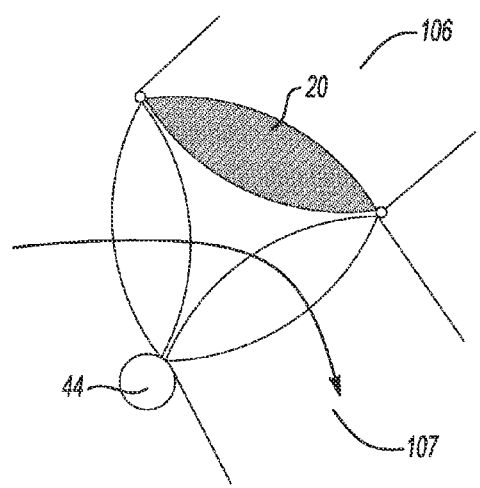
FIG. 18C is a semi-schematic detail view of the valve depicted in FIG. 18A with the valve blocking the rear vent duct and allowing air to flow through to the rear floor duct.
Figure 18D:
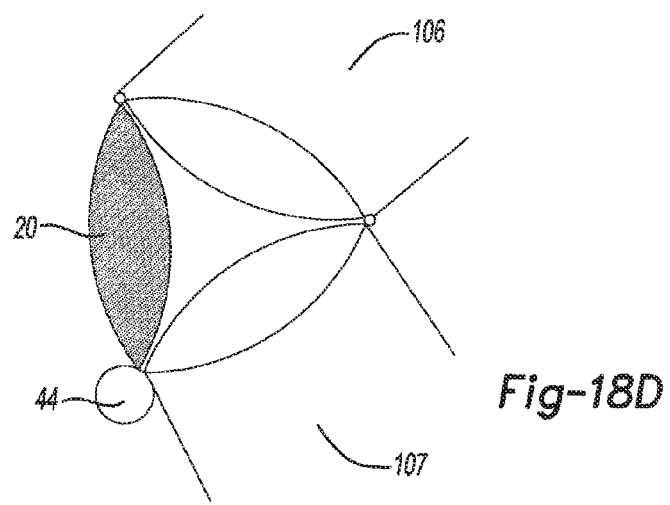
FIG. 18D is a semi-schematic detail view of the valve depicted in FIG. 18A with the valve blocking the air inlet, for example, in an HVAC windshield defrost function.
Figure 19:
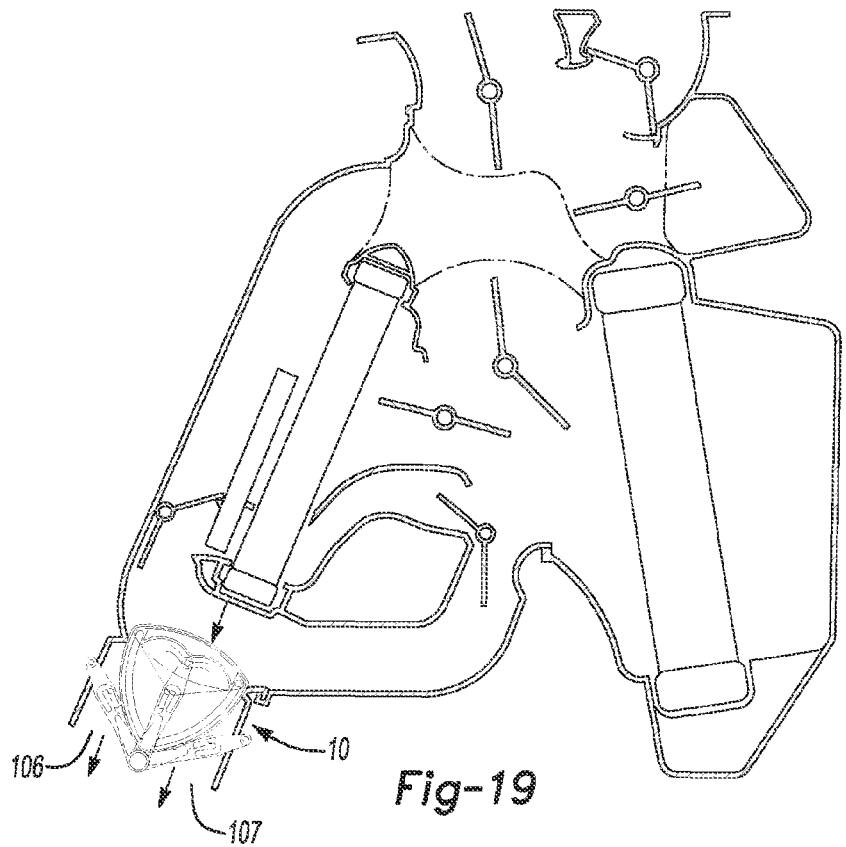
FIG. 19 is a semi-schematic cross section view of a portion of an HVAC system with a valve of the present disclosure to selectively direct flow to a rear vent or rear floor of a passenger vehicle.

FIG. 18A is a semi-schematic cross-sectional view of a portion of an HVAC system with a valve 10 of the present disclosure to selectively direct flow to a rear vent duct 106 or rear floor duct 107 of a passenger vehicle. In FIGS. 18B-18D, the shaded portion represents the door 20. FIG. 18B is a semi-schematic detail view of the valve 10 depicted in FIG. 18A with the door 20 blocking the rear floor duct 107 and allowing air to flow to the rear vent duct 106. FIG. 180 is a semi-schematic detail view of the valve 10 depicted in FIG. 18A with the door 20 blocking the rear vent duct 106 and allowing air to flow through to the rear floor duct 107. FIG. 180 is a semi-schematic detail view of the valve depicted in FIG. 18A with the door 20 blocking the air inlet, thereby preventing the air from flowing to the rear ducts 106, 107. The air that is blocked from flowing to the rear ducts 106, 107 may be redirected to the defrost duct 101. FIGS. 18A and 19 together show that the valve 10 of the present disclosure may be incorporated into the HVAC unit (see FIG. 19) or located remotely from the HVAC unit as a satellite component (see FIG. 18A) to be packaged, e.g., under the seat (not shown) or in the center console (not shown).

FIG. 19 is a semi-schematic cross section view of a portion of an HVAC system with a valve 10 of the present disclosure to selectively direct flow to a rear vent 106 or rear floor 107 of a passenger vehicle. By positioning the valve 10 as disclosed above, airflow to the rear of the passenger vehicle may be shut off; directed to the rear floor 107; directed to the rear vent 106; or directed to both the rear floor 107 and the rear vent 106.

Some advantages of examples of the present disclosure are described below.

Example(s) of the present disclosure advantageously control flow through three ports with a single door that has non-sliding, compression seals. Existing valves either use sliding seals, or at least 2 doors to control flow through three ports. Reduced friction and shear forces in the non-sliding, or compression seals of the example of the present disclosure compared to existing valves with sliding seals advantageously have greater durability. Further, the example of the present disclosure advantageously allows more precise control by an automatic actuator by eliminating the need to overcome relatively difficult differences between static friction and sliding friction, as well as the indeterminate nature of the loading. Still further, compressive seals may have a production cost advantage over sliding seals.

In another example, the door is rotatable about the first pivot axis to selectably adjust a first proportion of opening between the first port and the second port; and the door is rotatable about the second pivot axis to selectably adjust a second proportion of opening between the third port and the first port. The alternative rotation about the first pivot axis and the second pivot axis contributes to the advantageous use of compression seals rather than sliding seals.

In a further example, the first pivot axis traverses a first circular arc in the rotation of the door about the second pivot axis; and the second pivot axis traverses a second circular arc in the rotation of the door about the first pivot axis. The traversal of circular arcs by the alternative axes contributes to the advantageous use of compression seals rather than sliding seals.

In yet a further example, the three seal flanges define a door operation pocket having a central axis; the first pivot axis is parallel to the central axis; the sealing face has a first side and a second side opposite the first side; the first side of the sealing face has a first sealing edge complementary to the first port seal flange, the first sealing edge defining a perimeter of a segment of a right circular cylinder having a center axis parallel to the first pivot axis; and the second side of the sealing face has a second sealing edge that mirrors the first sealing edge about a plane defined by the first pivot axis and the second pivot axis, the second sealing edge complementary to the second port seal flange and complementary to the third port seal flange. The door has a core to prevent the fluid from flowing through a space bounded by the first sealing edge and the second sealing edge; the door has a crank arm extending from the core; the crank arm has a cylindrical post extending from a surface of the crank arm; the cylindrical post is parallel to the first pivot axis; a cam track is defined by the crank arm to guide a cam portion of the lever; a first portion of the resilient seal is disposed on the first side of the sealing face continuously along the first sealing edge; and a second portion of the resilient seal is disposed on the second side of the sealing face continuously along the second sealing edge.

In still yet another example, the resilient seal is compressed between the sealing face of the door and the third port seal flange to block fluid flow through the third port when the door is in the third port sealed position; the resilient seal is compressed between the sealing face of the door and the first port seal flange to block fluid flow through the first port when the door is in a first port sealed position; and the resilient seal is compressed between the sealing face of the door and the second port seal flange to block fluid flow through the second port when the door is in a second port sealed position. The compression of the resilient seal to block fluid flow through the first, second and third ports advantageously provides more durable sealing compared to barrel door valves with sliding seals.

In an example, a cross-section of the door operation pocket cut by a plane perpendicular to the central axis defines a Reuleaux triangle. The Reuleaux triangle advantageously allows efficient rotation of the door about the first and second pivot axes and contributes to the advantageous use of compression seals rather than sliding seals.

Yet in another example, the door includes a first bearing surface defined at a first contact between the door and the housing at a first vertex of the door operation pocket opposite the third port seal flange to guide the door in rotation about the first pivot axis when the door moves between the first port closed position and the second port closed position; and the door includes a second bearing surface defined at a second contact between the door and the housing at a second vertex of the door operation pocket opposite the second port seal flange to guide the door in rotation about the second pivot axis when the door moves between the first port closed position and the third port closed position. The bearing surfaces advantageously allow durable, repeatable operation of the door, prevent jamming and contribute to the advantageous use of compression seals rather than sliding seals.

In a further example, the door includes a first stub shaft disposed thereon coaxial to the first pivot axis; the first stub shaft projects away from the door; the housing includes a first groove to receive the first stub shaft; the first groove is to guide the first stub shaft in a path along the first circular arc parallel to a second port seal arc portion of the second port seal flange; the door includes a second stub shaft disposed thereon coaxial to the second pivot axis; the second stub shaft projects away from the door; the housing includes a second groove to receive the second stub shaft; and the second groove is to guide the second stub shaft in a path along the second circular arc parallel to a third port seal arc portion of the third port seal flange. The interaction between the stub shafts and the grooves advantageously more precisely guides motion of the door, prevents jamming and contributes to the advantageous use of compression seals rather than sliding seals.

In another example, the lever defines a U-shaped track to engage the cylindrical post. The engagement of the cylindrical post by the U-shaped track advantageously controls the rotation of the door about the first and second pivot axes with a single lever rotated by a single actuator.

In another example, the lever applies tension via the U-shaped track to the cylindrical post to pull on the crank arm to urge the door to the third port sealed position with a force along a line between the cylindrical post and a third port seal flange centroid when the door is in the third port sealed position and the lever is rotated to a third port sealed angle; the lever applies compression via the cam portion to the cam track to push on the crank arm to urge the door to the first port sealed position with a force along a line between the cylindrical post and a first port seal flange centroid when the door is in the first port sealed position and the lever is rotated to a first port sealed angle; and the lever applies tension via the U-shaped track to the cylindrical post to pull on the crank arm to urge the door to the second port sealed position with a force along a line between the cylindrical post and a second port seal flange centroid when the door is in the second port sealed position and the lever is rotated to a second port sealed angle. The lines of the application of tension and compression contribute to the advantageous use of compression seals rather than sliding seals.

In another example, the door is in the first port sealed position when the lever is within a dwell angle of the first port sealed angle; and the U-shaped track has a clearance to the cylindrical post when the lever is within the dwell angle of the first port sealed angle. The clearance between the U-shaped track and the cylindrical post in the dwell angle advantageously allows the cam track and cam to cause the seal to compress without the cylindrical post binding in the U-shaped track, thereby contributing to the advantageous use of compression seals rather than sliding seals.

In an example, the dwell angle is from about 2 degrees to about 6 degrees. The dwell angle being from about 2 degrees to about 6 degrees advantageously allows the compression seal to be robust to manufacturing tolerances and control tolerances of an automatic actuator.

In still a further example, the lever rotates about an axle positioned radially outward of the door operation pocket along a line through the central axis and a second vertex of the door operation pocket opposite the first port seal flange; the lever substantially fills a first notch in the third port seal flange to present a first surface to the resilient seal with the third port seal flange when the door is in the third port sealed position to prevent fluid from bypassing the door; and the lever substantially fills a second notch in the second port seal flange to present a second substantially continuous surface to the resilient seal with the second port seal flange when the door is in the second port sealed position to prevent fluid from bypassing the door. Such an example advantageously reduces intrusion of the lever into the flow path and prevents fluid from bypassing the door at the notch through which the lever swings.

Yet in another example, the lever includes a central slot to receive the crank arm; the central slot is defined between a first leg and a second leg of the lever; the first leg has symmetrically opposite geometry of the second leg; the crank arm has bilateral symmetry about a medial plane orthogonal to the axle; and a resultant vector of forces applied by the lever on the crank arm lies in the medial plane. The resultant vector of forces applied by the lever on the crank arm lying in the medial plane advantageously reduces torque out of the medial plane, thereby eliminating a need for compensation (e.g., with stiffness or bearings) to reduce twisting of the door in the door operation pocket and binding.

In another example, a cam engagement with the cam track causes a torque to rotate the door about the first pivot axis when the lever is rotated between the first port sealed angle and a first cam release angle between the first port sealed angle and the second port sealed angle; and the cam engagement with the cam track causes a torque to rotate the door about the second pivot axis when the lever is rotated between the first port sealed angle and a second cam release angle between the first port sealed angle and the third port sealed angle. The torque to rotate the door is advantageously applied by the cam engagement with the cam track at door rotation angles where the torque from the U-shaped track and the cylindrical post is relatively low. Therefore, stalling of an automatic actuator may be advantageously prevented, or an automatic actuator with less torque may be applied.

In another example, the valve further includes a rotary actuator having an output shaft with an output shaft axis of rotation; and the output shaft is connected to the axle for rotation therewith wherein the output shaft axis of rotation is coaxial with the axle. The coaxial output shaft axis of rotation and axle advantageously allow the output shaft and axle to be integrated, or to reduce a quantity of parts required for coupling. The coaxial output shaft axis of rotation and axle also advantageously reduces potential eccentric loading on the rotary actuator.

Although the present disclosure has presented detail related to examples implemented in an automotive HVAC application, it is to be understood that the disclosure is not limited to automotive applications or the control of airflow. For example, a flow of water or glycol may be controlled by an example of a valve of the present disclosure. Further, examples of the present disclosure may be applied to residential or commercial building HVAC systems.

It is to be understood that the ranges provided herein include the stated range and any value or sub-range within the stated range. For example, a range of from about 2 degrees to about 6 degrees should be interpreted to include not only the explicitly recited limits of about 2 degrees to about 6 degrees, but also to include individual values, such as 4 degrees, 5.1 degrees, etc., and sub-ranges, such as from about 3 degrees to 5 degrees, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "are", and "the" include plural referents unless the context clearly dictates otherwise.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. Indirect communication may include communication between two components with additional component(s) located therebetween.

While several examples have been described in detail, it will be apparent to those skilled in the art that the disclosed examples may be modified. Therefore, the foregoing description is to be considered non-limiting.

What is claimed is:

1. A valve, comprising:
   a housing defining a fluid flow path having a first port, a second port, and a third port;
   a door disposed in the fluid flow path to selectably control a flow of fluid through the flow path in response to a rotation of a lever;
   three seal flanges each defining a respective perimeter of the first port, the second port, and the third port;
   the door having three closed positions including a first port closed position, a second port closed position, and a third port closed position wherein a resilient seal is compressed between a sealing face of the door and each of the three seal flanges respectively in turn when the door is in each of the three closed positions;
   the door having a first pivot axis and a second pivot axis parallel to and spaced from the first pivot axis; and
   the door alternatively rotatable about the first pivot axis and the second pivot axis to selectably close, each individually and separately in turn, the first port, the second port, and the third port.

2. The valve as defined in claim 1 wherein:
   the door is rotatable about the first pivot axis to selectably adjust a first proportion of opening between the first port and the second port, wherein the first proportion of opening is selectably and continuously adjustable from zero percent opening of the first port and one hundred percent opening of the second port to one hundred percent opening of the first port and zero percent opening of the second port; and
   the door is rotatable about the second pivot axis to selectably adjust a second proportion of opening between the third port and the first port, wherein the second proportion of opening is selectably and continuously adjustable from zero percent opening of the third port and one hundred percent opening of the first port to one hundred percent opening of the third port and zero percent opening of the first port.

3. The valve as defined in claim 1 wherein:
   the first pivot axis traverses a first circular arc in the rotation of the door about the second pivot axis; and
   the second pivot axis traverses a second circular arc in the rotation of the door about the first pivot axis.

4. The valve as defined in claim 3 wherein:
   the three seal flanges define a door operation pocket having a central axis;
   the first pivot axis is parallel to the central axis;
   the sealing face has a first side and a second side opposite the first side;
   the first side of the sealing face has a first sealing edge complementary to the first port seal flange, the first sealing edge defining a perimeter of a segment of a right circular cylinder having a center axis parallel to the first pivot axis;
   the second side of the sealing face has a second sealing edge that mirrors the first sealing edge about a plane defined by the first pivot axis and the second pivot axis, the second sealing edge complementary to the second port seal flange and complementary to the third port seal flange;
   the door has a core to prevent the fluid from flowing through a space bounded by the first sealing edge and the second sealing edge;
   the door has a crank arm extending from the core;
   the crank arm has a cylindrical post extending from a surface of the crank arm;
   the cylindrical post is parallel to the first pivot axis;
   a cam track is defined by the crank arm to guide a cam portion of the lever;
   a first portion of the resilient seal is disposed on the first side of the sealing face continuously along the first sealing edge; and
   a second portion of the resilient seal is disposed on the second side of the sealing face continuously along the second sealing edge.

5. The valve as defined in claim 4 wherein:
   the resilient seal is compressed between the sealing face of the door and the third port seal flange to block fluid flow through the third port when the door is in the third port sealed position;
   the resilient seal is compressed between the sealing face of the door and the first port seal flange to block fluid flow through the first port when the door is in a first port sealed position; and
   the resilient seal is compressed between the sealing face of the door and the second port seal flange to block fluid flow through the second port when the door is in a second port sealed position.

6. The valve as defined in claim 5 wherein:
the door includes a first stub shaft disposed thereon coaxial to the first pivot axis;
the first stub shaft projects away from the door;
the housing includes a first groove to receive the first stub shaft;
the first groove is to guide the first stub shaft in a path along the first circular arc parallel to a second port seal arc portion of the second port seal flange;
the door includes a second stub shaft disposed thereon coaxial to the second pivot axis;
the second stub shaft projects away from the door;
the housing includes a second groove to receive the second stub shaft; and
the second groove is to guide the second stub shaft in a path along the second circular arc parallel to a third port seal arc portion of the third port seal flange.

7. The valve as defined in claim 6 wherein the lever defines a U-shaped track to engage the cylindrical post.

8. The valve as defined in claim 7 wherein:
the lever applies tension via the U-shaped track to the cylindrical post to pull on the crank arm to urge the door to the third port sealed position with a force along a line between the cylindrical post and a third port seal flange centroid when the door is in the third port sealed position and the lever is rotated to a third port sealed angle;
the lever applies compression via the cam portion to the cam track to push on the crank arm to urge the door to the first port sealed position with a force along a line between the cylindrical post and a first port seal flange centroid when the door is in the first port sealed position and the lever is rotated to a first port sealed angle; and
the lever applies tension via the U-shaped track to the cylindrical post to pull on the crank arm to urge the door to the second port sealed position with a force along a line between the cylindrical post and a second port seal flange centroid when the door is in the second port sealed position and the lever is rotated to a second port sealed angle.

9. The valve as defined in claim 8 wherein:
a cam engagement with the cam track causes a torque to rotate the door about the first pivot axis when the lever is rotated between the first port sealed angle and a first cam release angle between the first port sealed angle and the second port sealed angle; and
the cam engagement with the cam track causes a torque to rotate the door about the second pivot axis when the lever is rotated between the first port sealed angle and a second cam release angle between the first port sealed angle and the third port sealed angle.

10. The valve as defined in claim 8 wherein:
the door is in the first port sealed position when the lever is within a dwell angle of the first port sealed angle; and
the U-shaped track has a clearance to the cylindrical post when the lever is within the dwell angle of the first port sealed angle.

11. The valve as defined in claim 10 wherein the dwell angle is from about 2 degrees to about 6 degrees.

12. The valve as defined in claim 4 wherein a cross-section of the door operation pocket cut by a plane perpendicular to the central axis defines a Reuleaux triangle.

13. The valve as defined in claim 12 wherein:
the door includes a first bearing surface defined at a first contact between the door and the housing at a first vertex of the door operation pocket opposite the third port seal flange to guide the door in rotation about the first pivot axis when the door moves between the first port closed position and the second port closed position; and
the door includes a second bearing surface defined at a second contact between the door and the housing at a second vertex of the door operation pocket opposite the second port seal flange to guide the door in rotation about the second pivot axis when the door moves between the first port closed position and the third port closed position.

14. The valve as defined in claim 7 wherein:
the lever rotates about an axle positioned radially outward of the door operation pocket along a line through the central axis and a second vertex of the door operation pocket opposite the first port seal flange;
the lever substantially fills a first notch in the third port seal flange to present a first surface to the resilient seal with the third port seal flange when the door is in the third port sealed position to prevent fluid from bypassing the door; and
the lever substantially fills a second notch in the second port seal flange to present a second substantially continuous surface to the resilient seal with the second port seal flange when the door is in the second port sealed position to prevent fluid from bypassing the door.

15. The valve as defined in claim 14 wherein:
the lever includes a central slot to receive the crank arm;
the central slot is defined between a first leg and a second leg of the lever;
the first leg has symmetrically opposite geometry of the second leg;
the crank arm has bilateral symmetry about a medial plane orthogonal to the axle; and
a resultant vector of forces applied by the lever on the crank arm lies in the medial plane.

16. The valve as defined in claim 14, further comprising:
a rotary actuator having an output shaft with an output shaft axis of rotation; and
the output shaft is connected to the axle for rotation therewith wherein the output shaft axis of rotation is coaxial with the axle.

* * * * *